US012627647B2

(12) United States Patent
Zhu

(10) Patent No.: US 12,627,647 B2
(45) Date of Patent: May 12, 2026

(54) DATA PROCESSING METHOD AND APPARATUS, COMPUTER DEVICE, AND READABLE STORAGE MEDIUM

(71) Applicant: TENCENT TECHNOLOGY (SHENZHEN) COMPANY LIMITED, Shenzhen (CN)

(72) Inventor: Gengliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 47 days.

(21) Appl. No.: 18/744,150

(22) Filed: Jun. 14, 2024

(65) Prior Publication Data

US 2024/0333702 A1 Oct. 3, 2024

Related U.S. Application Data

(63) Continuation of application No. PCT/CN2023/089109, filed on Apr. 19, 2023.

(30) Foreign Application Priority Data

May 17, 2022 (CN) .......................... 202210536186.7

(51) Int. Cl.
*H04L 9/40* (2022.01)
(52) U.S. Cl.
CPC .................................... *H04L 63/08* (2013.01)
(58) Field of Classification Search
CPC ......... H04L 63/08; H04L 9/3213; H04L 9/40; H04L 9/50; H04L 63/083; H04L 67/1097; H04L 67/60; H04L 63/0807
(Continued)

(56) References Cited

U.S. PATENT DOCUMENTS 11,233,792 B2 1/2022 Mittal et al.
2018/0248880 A1* 8/2018 Sardesai ............... H04L 9/3239
(Continued)

FOREIGN PATENT DOCUMENTS

CN 108805573 A 11/2018
CN 112989426 A 6/2021
CN 112989426 B 8/2021

OTHER PUBLICATIONS

The World Intellectual Property Organization (WIPO) International Search Report for PCT/CN2023/089109 May 23, 2023 5 Pages (including translation).

(Continued)

*Primary Examiner* — Meng Vang
(74) *Attorney, Agent, or Firm* — Anova Law Group, PLLC

(57) ABSTRACT

A data processing method includes invoking an object login service based on an authorization request transmitted through an application client, obtaining target login information entered in the object login service, performing matching of the target login information with object credential information through the object login service, obtaining an object authorization code if the target login information matches the object credential information, receiving a token obtaining request transmitted by the application client based on the object authorization code, invoking a token issuance service based on the token obtaining request, and obtaining an object token through the token issuance service. The object token is configured to provide the application client with an operation permission to operate resource data within a scope of authority through the service node.

18 Claims, 7 Drawing Sheets

(58) Field of Classification Search
　　USPC ........................................................... 726/7
　　See application file for complete search history.

(56)　　　　　　　　　References Cited

U.S. PATENT DOCUMENTS

| 2019/0163896 | A1 | 5/2019 | Balaraman et al. | |
| 2019/0342290 | A1* | 11/2019 | Mittal | H04L 63/083 |
| 2019/0372958 | A1 | 12/2019 | Dunjic et al. | |
| 2020/0074056 | A1* | 3/2020 | Hruska | H04W 12/06 |
| 2021/0314156 | A1* | 10/2021 | Liu | H04L 9/0861 |
| 2023/0034169 | A1* | 2/2023 | Ferenczi | H04L 9/0894 |

OTHER PUBLICATIONS

The European Patent Office (EPO) The Extended European Search Report for Application No. 23806672.4 May 8, 2025 9 Pages.

* cited by examiner

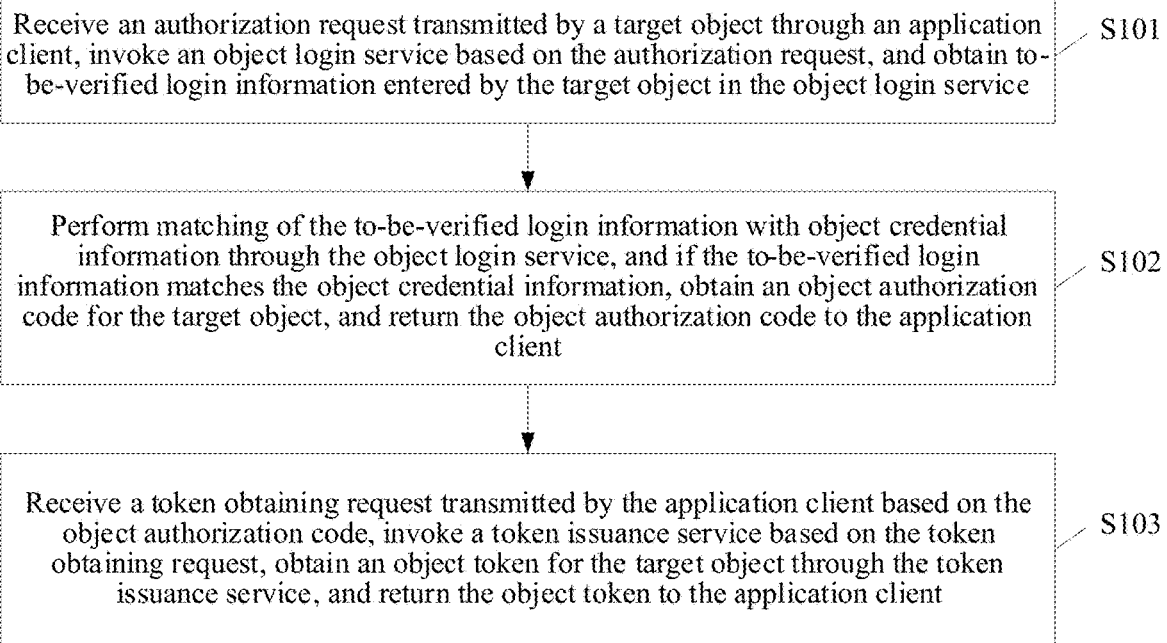

Receive an authorization request transmitted by a target object through an application client, invoke an object login service based on the authorization request, and obtain to-be-verified login information entered by the target object in the object login service — S101

Perform matching of the to-be-verified login information with object credential information through the object login service, and if the to-be-verified login information matches object credential information, obtain an object authorization code for the target object, and return the object authorization code to the application client — S102

Receive a token obtaining request transmitted by the application client based on the object authorization code, invoke a token issuance service based on the token obtaining request, obtain an object token for the target object through the token issuance service, and return the object token to the application client — S103

FIG. 3

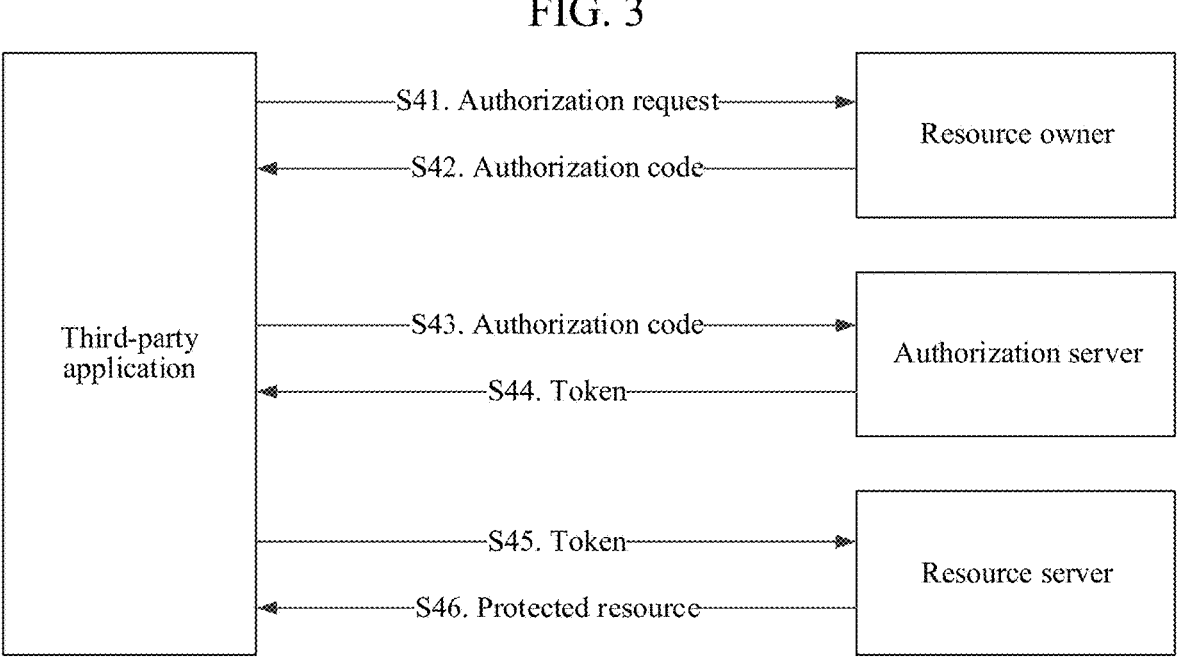

Third-party application

S41. Authorization request →
← S42. Authorization code

Resource owner

S43. Authorization code →
← S44. Token

Authorization server

S45. Token →
← S46. Protected resource

Resource server

FIG. 4

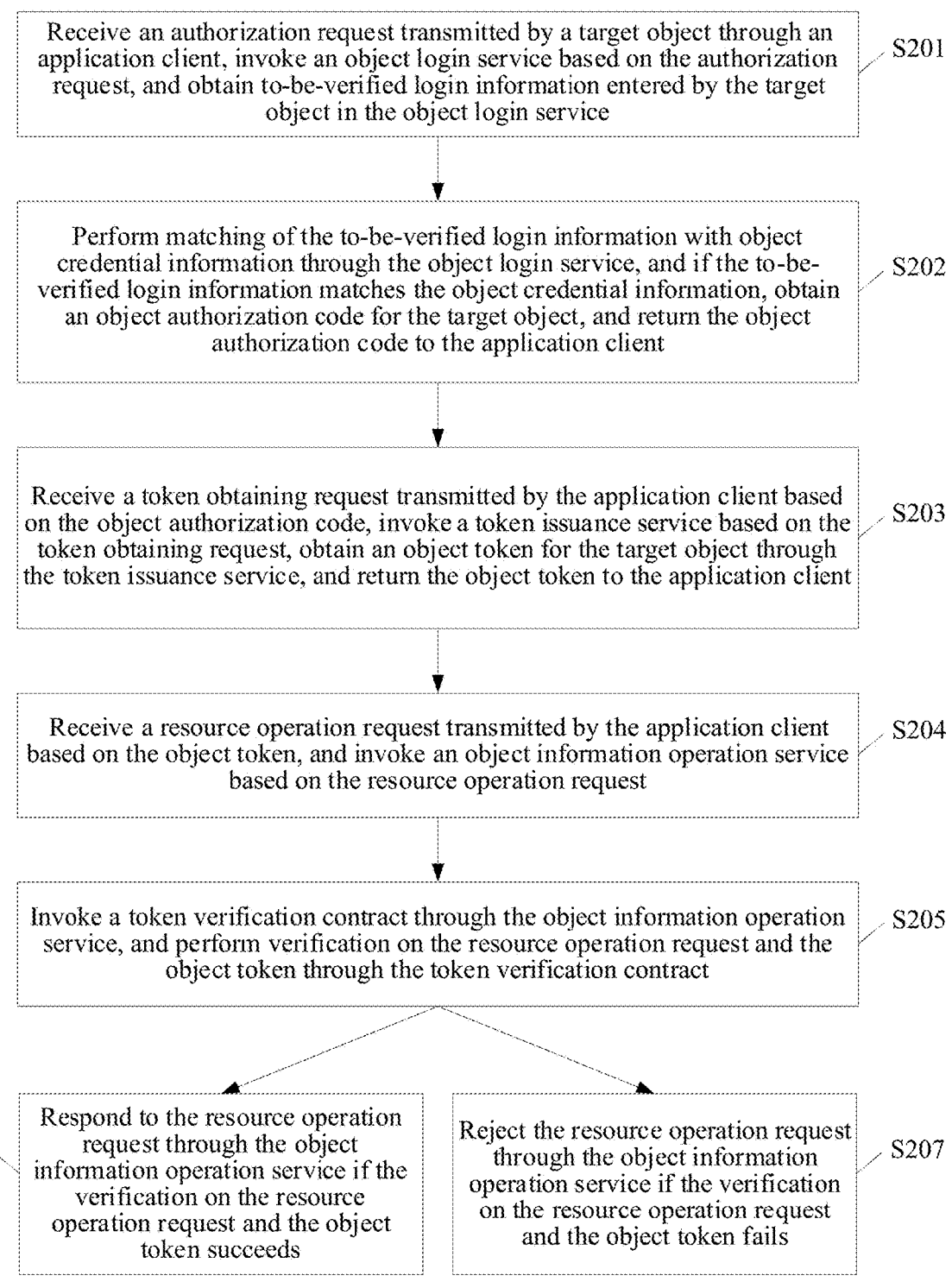

Receive an authorization request transmitted by a target object through an application client, invoke an object login service based on the authorization request, and obtain to-be-verified login information entered by the target object in the object login service                  S201

Perform matching of the to-be-verified login information with object credential information through the object login service, and if the to-be-verified login information matches the object credential information, obtain an object authorization code for the target object, and return the object authorization code to the application client                  S202

Receive a token obtaining request transmitted by the application client based on the object authorization code, invoke a token issuance service based on the token obtaining request, obtain an object token for the target object through the token issuance service, and return the object token to the application client                  S203

Receive a resource operation request transmitted by the application client based on the object token, and invoke an object information operation service based on the resource operation request                  S204

Invoke a token verification contract through the object information operation service, and perform verification on the resource operation request and the object token through the token verification contract                  S205

S206  Respond to the resource operation request through the object information operation service if the verification on the resource operation request and the object token succeeds Reject the resource operation request through the object information operation service if the verification on the resource operation request and the object token fails                  S207

FIG. 6

DATA PROCESSING METHOD AND APPARATUS, COMPUTER DEVICE, AND READABLE STORAGE MEDIUM

CROSS-REFERENCE TO RELATED APPLICATIONS

This application is a continuation of International Application No. PCT/CN2023/089109, filed on Apr. 19, 2023, which claims priority to Chinese Patent Application No. 202210536186.7, entitled "DATA PROCESSING METHOD AND APPARATUS, COMPUTER DEVICE, AND READABLE STORAGE MEDIUM" filed with the China National Intellectual Property Administration on May 17, 2022, the entire contents of both of which are incorporated herein by reference.

FIELD OF THE TECHNOLOGY

This application relates to the field of blockchain technologies, and in particular, to a data processing method and apparatus, a computer device, and a readable storage medium.

BACKGROUND OF THE DISCLOSURE

In the related art, an identity management system may store, in a centralized server (that is, an authorization server), identity management information used for login. The identity management information stored in the authorization server is associated with all objects. That is, the identity management information required by all the objects for login is stored in the authorization server. Therefore, when needing to perform login through an application client, all the objects need to transmit a login request to the authorization server, to implement a login operation on the application client.

SUMMARY

In accordance with the disclosure, there is provided a data processing method performed by a service node in a blockchain network and including receiving an authorization request transmitted through an application client, invoking an object login service based on the authorization request, obtaining target login information entered in the object login service, performing matching of the target login information with object credential information through the object login service, and, in response to the target login information matching the object credential information, obtaining an object authorization code and returning the object authorization code to the application client. The object credential information is obtained by the service node from a consensus node of the blockchain network. The method further includes receiving a token obtaining request transmitted by the application client based on the object authorization code, invoking a token issuance service based on the token obtaining request, and obtaining an object token through the token issuance service. The object token is configured to provide the application client with an operation permission to operate resource data within a scope of authority through the service node. The method also includes returning the object token to the application client.

Also in accordance with the disclosure, there is provided a computer device serving as a service node of a blockchain network and including one or more processors, and one or more memories storing one or more computer programs that, when executed by the one or more processors, cause the computer device to receive an authorization request transmitted through an application client, invoke an object login service based on the authorization request, obtain target login information entered in the object login service, perform matching of the target login information with object credential information through the object login service, and, in response to the target login information matching the object credential information, obtain an object authorization code and returning the object authorization code to the application client. The object credential information is obtained by the service node from a consensus node of the blockchain network. The one or more computer programs, when executed by the one or more processors, further cause the computer device to receive a token obtaining request transmitted by the application client based on the object authorization code, invoke a token issuance service based on the token obtaining request, and obtain an object token through the token issuance service. The object token is configured to provide the application client with an operation permission to operate resource data within a scope of authority through the service node. The one or more computer programs, when executed by the one or more processors, also cause the computer device to return the object token to the application client.

Also in accordance with the disclosure, there is provided a non-transitory computer-readable storage medium storing one or more computer programs that, when executed by one or more processors, cause a computer device including the one or more processors to receive an authorization request transmitted through an application client, invoke an object login service based on the authorization request, obtain target login information entered in the object login service, perform matching of the target login information with object credential information through the object login service, and, in response to the target login information matching the object credential information, obtain an object authorization code and returning the object authorization code to the application client. The object credential information is obtained by the service node from a consensus node of the blockchain network. The one or more computer programs, when executed by the one or more processors, further cause the computer device to receive a token obtaining request transmitted by the application client based on the object authorization code, invoke a token issuance service based on the token obtaining request, and obtain an object token through the token issuance service. The object token is configured to provide the application client with an operation permission to operate resource data within a scope of authority through the service node. The one or more computer programs, when executed by the one or more processors, also cause the computer device to return the object token to the application client.

BRIEF DESCRIPTION OF THE DRAWINGS

To describe the technical solutions of the embodiments of this application or the related art more clearly, the following briefly introduces the accompanying drawings required for describing the embodiments or the related art. The accompanying drawings in the following description show merely some embodiments of this application, and a person of ordinary skill in the art may still derive other drawings from these accompanying drawings without creative efforts.

FIG. 3 is a schematic flowchart of a data processing method according to an embodiment of this application.

FIG. 4 is a schematic flowchart showing applying for a resource according to an embodiment of this application.

FIG. 6 is a schematic flowchart of a data processing method according to an embodiment of this application.

DESCRIPTION OF EMBODIMENTS

The following clearly and completely describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

When a user performs login through an application client, if there are a large number of application clients transmitting login requests to an authorization server at the same time, the authorization server cannot process the large number of login requests in time, resulting in a phenomenon that the application clients queue and wait. Consequently, the application client cannot complete a login operation in time, which further reduces the efficiency of performing login on the application client. In addition, when the authorization server fails, the authorization server cannot successfully respond to the login request from the application client. Consequently, the application client cannot successfully complete the login operation, which reduces the stability of performing login on the application client.

The embodiments of this application provide a data processing method and apparatus, a computer device, and a readable storage medium, to improve the efficiency and stability of logging in to an application client by a target object.

Figure 1:
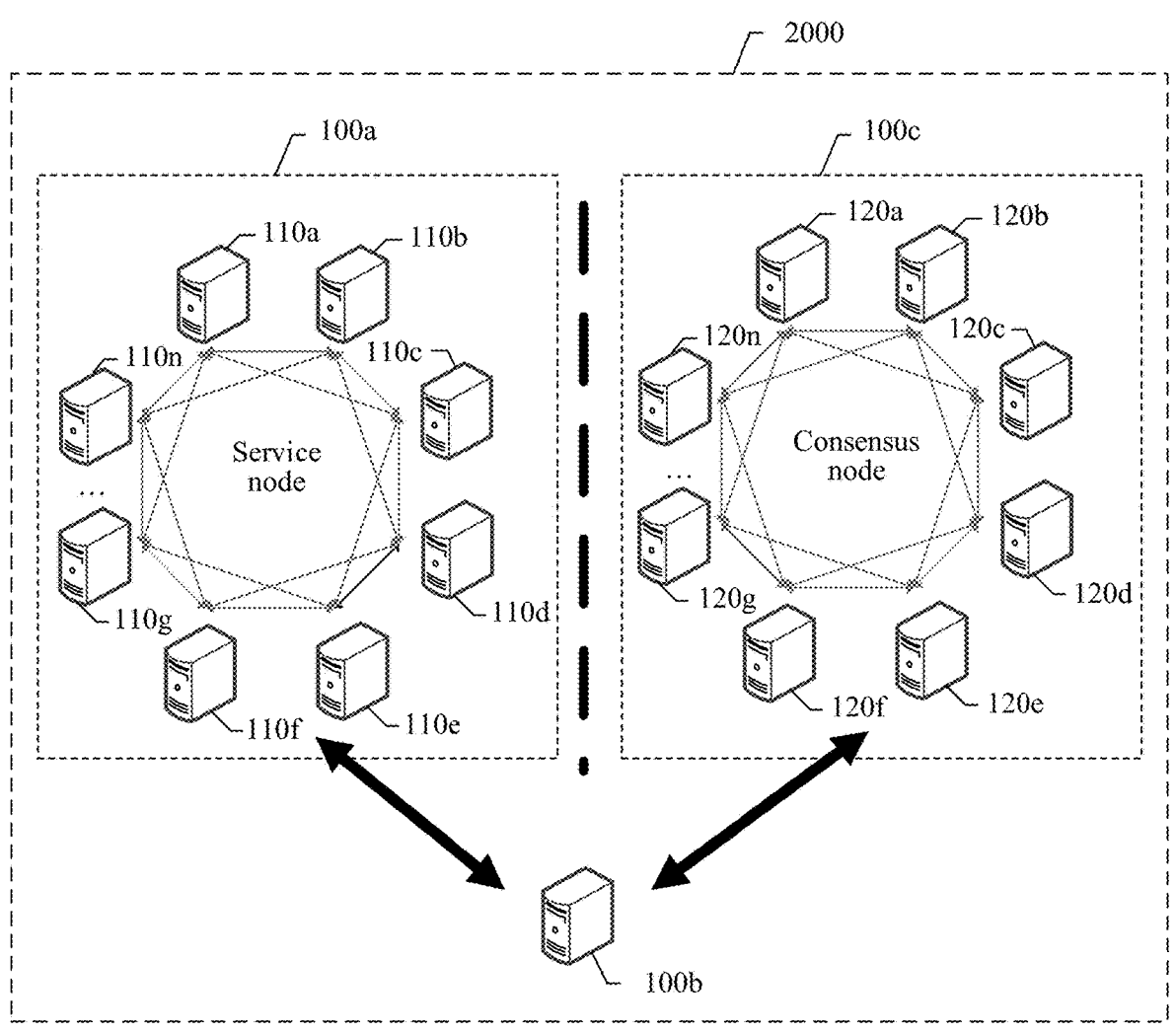
FIG. 1 is a schematic diagram showing a hierarchical structure of a blockchain network according to an embodiment of this application.

FIG. 1 is a schematic diagram showing a hierarchical structure of a blockchain network according to an embodiment of this application. The hierarchical structure of the blockchain network shown in FIG. 1 is applicable to a blockchain system. The blockchain system may include a proxy node (for example, a proxy node 100b), a first blockchain system, and a second blockchain system, to form a blockchain network 2000 shown in FIG. 1. Both the first blockchain system and the second blockchain system may include one or more nodes. Quantities of nodes in the first blockchain system and the second blockchain system are not limited. As shown in FIG. 1, the first blockchain system may specifically include a node 110a, a node 110b, a node 110c, . . . , and a node 110n. The second blockchain system may specifically include a node 120a, a node 120b, a node 120c, . . . , and a node 120n.

A blockchain network that the first blockchain system corresponds to may be referred to as a service network (that is, a witness network) 100a, and a node in the service network 100a may be referred to as a service node. The service node is mainly configured to execute an exchange service, to obtain exchange data associated with the exchange service. The service node herein can obtain block header data and a part of authorized-to-be-visible block data from a core consensus network through identity authentication without participating in accounting consensus. To ensure the information exchange in the first blockchain system, there may be information connections among nodes in the first blockchain system, and the nodes may transmit information through the information connections.

A blockchain network that the second blockchain system corresponds to may be referred to as a core consensus network (that is, a consensus network) 100c, and a node in the core consensus network 100c may be referred to as a consensus node (that is, a bookkeeping node). A blockchain consensus protocol may be run on the consensus node herein. To ensure the information exchange in the second blockchain system, there may be information connections among nodes in the second blockchain system, and the nodes may transmit information through the information connections.

Connection manners of the information connections in the first blockchain system and the second blockchain system are not limited. Direct or indirect connections may be performed in a wired communication manner, a wireless communication manner, or another connection manner, which is not limited this application.

The proxy node 100b shown in FIG. 1 may be configured to perform network quarantine on the service network 100a and the core consensus network 100c. The proxy node 100b may perform network layering on a peer-to-peer (P2P) network to form a hierarchical structure (that is, a double-layered chain structure) such as a "service network-core consensus network," which can improve the confidentiality and security of on-chain data.

In the embodiments of this application, the proxy node 100b, the service node in the service network 100a, and the consensus node in the core consensus network 100c may be collectively referred to as a blockchain node in the blockchain network 2000. The blockchain node may be a server connected to the blockchain network 2000 or a terminal device connected to the blockchain network 2000. A specific form of the blockchain node is not limited herein.

The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal device may be a mobile phone, a tablet computer, a notebook computer, a palmtop computer, a smart speaker, a mobile Internet device (MID), a point of sale (POS) machine, a wearable device (for example, a smart watch or a smart bracelet), and the like.

Some nodes in the blockchain network 2000 shown in FIG. 1 store a complete blockchain database, and such nodes including all exchange data may be referred to as a full node (for example, the consensus node shown in FIG. 1). Some other nodes store parts of the blockchain database, generally store only a block header and exchange data associated with themselves, rather than store complete exchange data, and may complete exchange verification in a manner of "simplified payment verification (SPV)." Such nodes may be referred to as a lightweight node or an SPV node (for example, the service node shown in FIG. 1).

The service network 100a and the core consensus network 100c shown in FIG. 1 may be located in different network environments. Generally, the service network 100a may be located in a public network, and the core consensus network 100c may be located in a private network. Therefore, the service node is deployed in the service network 100a of the public network, and the consensus node is deployed in the core consensus network 100c of the private network. The two may interact with each other through a routing boundary.

For ease of understanding, in the embodiments of this application, a service node may be selected from a plurality of service nodes in the service network 110a shown in FIG. 1 as a target service node, and the target service node has a function of transmitting a data synchronization request to the proxy node 100b. For example, in the embodiments of this application, the node 110a shown in FIG. 1 may be used as the target service node. For ease of understanding, in the embodiments of this application, a consensus node may be selected from a plurality of consensus nodes in the core consensus network 100c shown in FIG. 1 as a target consensus node, and the target consensus node has a function of returning, to the proxy node 100b, synchronization data corresponding to the data synchronization request. For example, in the embodiments of this application, the node 120a shown in FIG. 1 may be used as the target consensus node. The proxy node 100b may forward, to the target consensus node, the data synchronization request transmitted by the target service node, and the proxy node 100b may forward, to the target service node, the synchronization data returned by the target consensus node.

Because the core consensus network is in a relatively secure private cloud, security of mutual access to the core consensus network is already ensured by a consensus mechanism, and addition of additional identity management and network control is not needed. However, the target service node is located in a public network and may be accessed by other uncertain network terminals. Therefore, behaviors of the target service node and other possible nodes accessing the core consensus network need to be strictly controlled. In this case, the proxy node and the target consensus node need to perform verification on the target service node that transmits the data synchronization request.

When receiving the data synchronization request transmitted by the target service node, the proxy node may perform permission verification on the target service node, to obtain a permission verification result. The permission verification herein may include verifying whether a node identifier of the target service node is a node identifier in a list of illegal nodes. The list of illegal nodes may be a blacklist stored in the proxy node, and an illegal node corresponding to an illegal node identifier in the list of illegal nodes refers to a detected malicious node, a node reported by others, a node whose transmission exchange frequency is abnormal within a specific period of time, or the like.

The proxy node may look up the list of illegal nodes for an illegal node identifier that is the same as the node identifier of the target service node, to obtain a permission verification result. If the permission verification result indicates that an illegal node identifier that is the same as the node identifier of the target node is found in the list of illegal nodes, the proxy node may determine that the permission verification result is an illegality verification result. In this case, the proxy node may determine that the target service node is an illegal node and further, does not need to forward the data synchronization request to the target consensus node in the core consensus network. In some embodiments, if the permission verification result indicates that no illegal node identifier that is the same as the node identifier of the target service node is found in the list of illegal nodes, the proxy node may determine that the permission verification result is a legality verification result. In this case, the proxy node may determine that the target service node is a legal node and further, may forward the data synchronization request to the target consensus node in the core consensus network.

The target service node may be configured to provide an object login service, a token issuance service, and an object information operation service. The object login service, the token issuance service, and the object information operation service may be deployed on a server program that is on a server and that provides remote network services specifically for an application client (that is, a third-party application). For ease of understanding, in the embodiments of this application, a user performing login through a third-party application may be referred to as a target object. The application client may specifically include clients with data processing functions such as a browser, an in-vehicle client, a smart home client, an entertainment client, a multimedia client (for example, a video client), a social client, and an information client. The in-vehicle client may be an application client on an in-vehicle terminal.

A service scenario to which the foregoing hierarchical structure is applicable may be an application authorization scenario, and synchronization data in the application authorization scenario may include object management information and a user management contract (that is, an object management contract). The object management information is stored in a blockchain maintained by the core consensus network in a distributed manner. The target service node may provide a service for the application client after performing synchronization verification on the object management information.

The object management information may represent attribute information associated with the user (that is, an object). The object management information may specifically include object credential information and object resource information. The object credential information may represent basic information (for example, an account number and a password) for login. The object resource information may represent basic information associated with the user indicated by the object credential information. The object management contract may be configured to process the object management information. The object management contract is a blockchain smart contract that manages user information, user registration, freezing, permission design, and the like. The object management contract may be executed through a blockchain exchange.

The target service node may authorize, based on the object management contract, a third-party application to perform login through the object credential information, and authorize the logged-in third-party application to operate the object resource information. In addition, the target service node may further provide functions owned by any other SPV node, for example, exchange verification, forwarding and addition to a blockchain, state querying, and block querying.

For ease of understanding, reference may be made to Table 1. Table 1 is a node identifier list provided in the embodiments of this application. The node identifier list may store a node identifier and a node name of a node visible to specific exchange data, as shown in Table 1:

TABLE 1

| Node name | Node identifier |
|-----------|-----------------|
| Node 1 | AAAAAA |
| Node 2 | BBBBBB |
| . . . | . . . |
| Node J | CCCCCC |

The node identifier may be an Internet Protocol (IP) address and any other information that can be configured to identify a node. For example, the node 1 (for example, the node 1 may be the node 110*a* shown in FIG. 1) may transmit information (for example, a data synchronization request) to the node 2 (for example, the node 2 may be the node 120*a* shown in FIG. 1) through the node identifier BBBBBB, and the node 2 may determine, through the node identifier AAAAAA, that the information is transmitted by the node 1. The node 2 may return information (for example, synchronization data) to the node 1 through the node identifier AAAAAA, and the node 1 may determine, through the node identifier BBBBBB, that the information is returned by the node 2. The proxy node 100*b* may forward the data synchronization request transmitted by the node 1 to the node 2, and the proxy node 100*b* may forward the synchronization data returned by the node 2 to the node 1. The node 1 herein may be a target service node, and the node 2 herein may be a target consensus node.

The target consensus node in the core consensus network may obtain encrypted data information transmitted by the proxy node 100*b*. The encrypted data information may be obtained by the proxy node 100*b* by encrypting the data synchronization request and signature information through a system public key of the core consensus network. The signature information may be obtained by the target service node in the service network by adding a signature to the data synchronization request through a node private key of the target service node. Further, the target consensus node may obtain a system private key of the core consensus network (that is, the system private key corresponding to the system public key of the core consensus network), and decrypt the encrypted data information through the system private key of the core consensus network, to obtain the data synchronization request and the signature information. Further, the target consensus node may obtain a node public key of the target service node (that is, the node public key corresponding to the node private key of the target service node), and perform signature verification on the signature information based on the node public key of the target service node, to obtain a signature verification result. Further, the target consensus node may receive the data synchronization request when the signature verification result indicates that the signature verification succeeds. In some embodiments, the target consensus node may reject to receive the data synchronization request when the signature verification result indicates that the signature verification fails.

The target service node may use a hash algorithm to perform hash calculation on the data synchronization request, to obtain digest information h of the data synchronization request, and add a digital signature to the digest information h based on the node private key of the target service node, to obtain signature information corresponding to the data synchronization request. The target consensus node may perform signature verification on the digital signature in the signature information based on the node public key of the target service node, to obtain the digest information h of the data synchronization request, perform hash calculation on the received data synchronization request based on the hash algorithm used by the target service node, to obtain digest information H of the data synchronization request, and further, compare the digest information h obtained through the signature verification with the digest information H obtained through the hash calculation, to obtain a signature verification result. When the digest information h is the same as the digest information H, the signature verification result indicates that the signature verification performed by the target consensus node succeeds. When the digest information h is different from the digest information H, the signature verification result indicates that the signature verification performed by the target consensus node fails.

In some embodiments, when forwarding the encrypted data information, the proxy node 100*b* may also encrypt the encrypted data information through a node private key of the proxy node 100*b*, to obtain encrypted encrypted data information, to cause the target consensus node to decrypt the encrypted encrypted data information through a node public key of the proxy node 100*b*. In some embodiments, before the target service node transmits the data synchronization request and the signature information to the proxy node 100*b*, the data synchronization request and the signature information may be encrypted through the node public key of the proxy node 100*b*, to obtain encrypted request information, and further, the encrypted request information is transmitted to the proxy node 100*b*. In this way, when receiving the encrypted request information, the proxy node 100*b* may decrypt the encrypted request information through the node private key of the proxy node 100*b*, to obtain the data synchronization request and the signature information.

Similarly, for a specific process of the target service node receiving the synchronization data forwarded by the proxy node 100*b*, reference may be made to the descriptions of the target consensus node receiving the data synchronization request forwarded by the proxy node 100*b*, and details are not described herein again.

Figure 2:
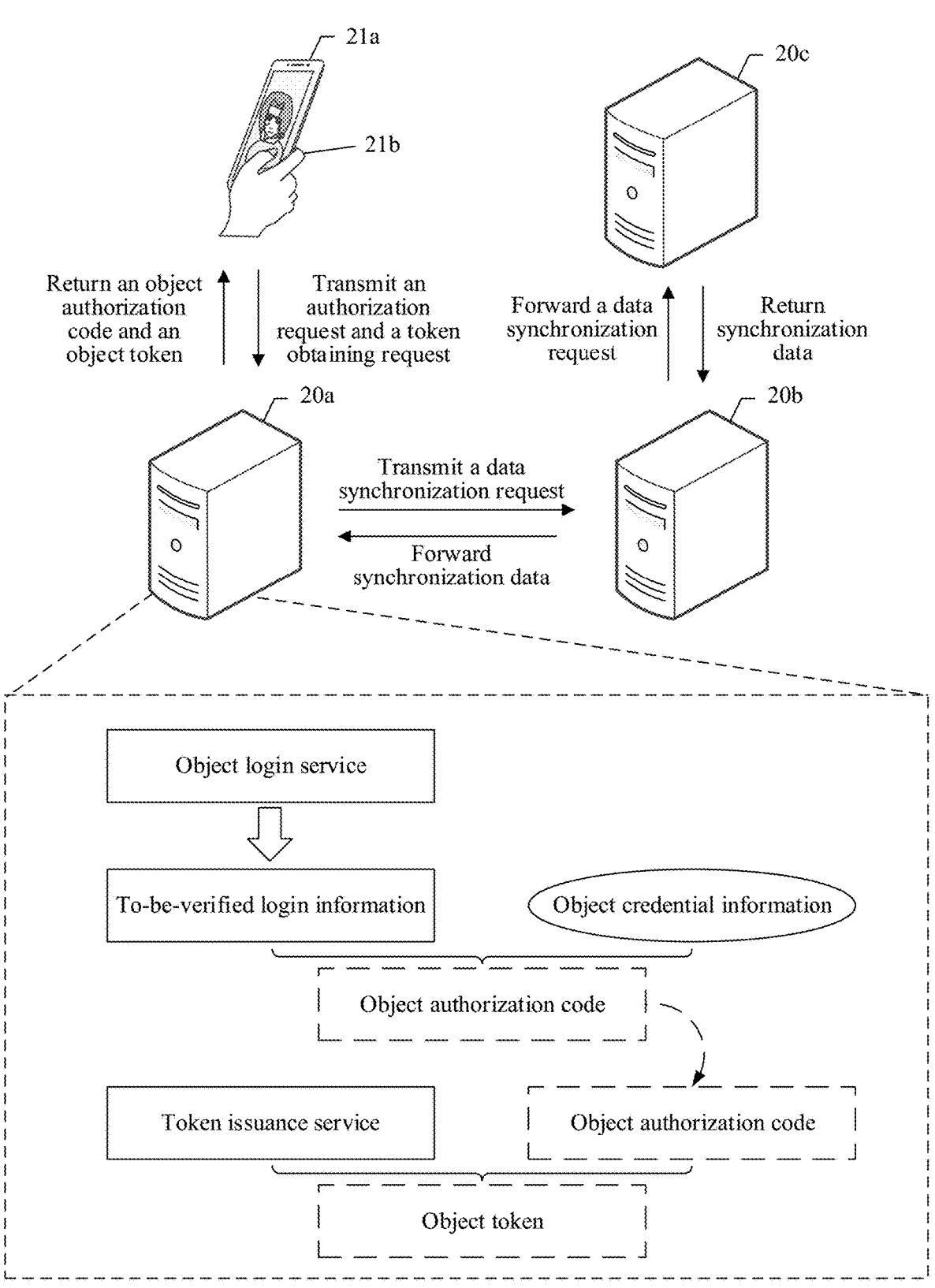
FIG. 2 is a schematic diagram showing a scenario of performing data exchanging according to an embodiment of this application.

For ease of understanding, further, reference may be made to FIG. 2. FIG. 2 is a schematic diagram showing a scenario of performing data exchanging according to an embodiment of this application. A service node 20*a* shown in FIG. 2 may be any node in the service network 100*a* in the embodiment corresponding to FIG. 1, and the proxy node 20*b* shown in FIG. 2 may be the proxy node 100*b* in the embodiment corresponding to FIG. 1, and a consensus node 20*c* shown in FIG. 2 may be any node in the core consensus network 100*c* in the embodiment corresponding to FIG. 1. For ease of understanding, in embodiments of this application, a specific process of performing data exchanging between the service node 20*a*, the proxy node 20*b*, and the consensus node 20*c* that are shown in FIG. 2 is described by using an example in which the node 110*a* shown in FIG. 1 is used as the service node 20*a* and the node 120*a* shown in FIG. 1 is used as the consensus node 20*c*.

As shown in FIG. 2, the service node 20*a* may transmit a data synchronization request to the proxy node 20*b*, and the proxy node 20*b* may forward the data synchronization request to the consensus node 20*c*. In this way, after obtaining synchronization data corresponding to the data synchronization request, the consensus node 20*c* may return the synchronization data to the proxy node 20*b*, and the proxy node 20*b* may forward the synchronization data to the service node 20*a*.

As shown in FIG. 2, an object 21b may be a target object, a terminal device corresponding to the object 21b may be a terminal device 21a. An application client may be installed on the terminal device 21a. Therefore, when the object 21b needs to log in to the application client on the terminal device 21a, the object 21b may transmit an authorization request to the service node 20a through the application client on the terminal device 21a. In this way, the service node 20a may receive the authorization request transmitted by the object 21b through the application client, invoke an object login service based on the authorization request, and return an object authorization code to the terminal device 21a through the object login service.

The service node 20a may obtain to-be-verified login information entered by the object 21b in the object login service, obtain object credential information in synchronization data, perform matching of the to-be-verified login information with the object credential information through the object login service, and if the to-be-verified login information matches the object credential information, obtain the object authorization code for the target object 20a, and further return the object authorization code to the terminal device 21a. In some embodiments, if the to-be-verified login information does not match the object credential information, the service node 20a does not need to return an object authorization code to the terminal device 21a.

As shown in FIG. 2, the object 21b may transmit a token obtaining request to the service node 20a through the application client on the terminal device 21a. The token obtaining request may carry the object authorization code. In this way, the service node 20a may receive the token obtaining request transmitted by the object 21b through the application client, invoke a token issuance service based on the token obtaining request, and return an object token to the terminal device 21a through a token transmitting service. The object token is a character string generated by the service node in response to a request transmitted by the application client, to enable the application client that owns the object token to have a corresponding operation permission for corresponding resource data. The object token may be used to replace a password. The object token has the following characteristics: The token is short-term and automatically becomes invalid when the token expires. The object token may be revoked by an owner of resource data, and become invalid immediately after revocation. The object token has a permission range, for example, an object token with a read-only permission is more secure than an object token with a read-write permission.

The service node 20a may perform verification on the object authorization code through the token transmitting service, and if the verification on the object authorization code succeeds, obtain an object token for the object 21b, and then return object token to the terminal device 21a. In some embodiments, if the verification on the object authorization code fails, the service node 20a does not need to return the object token to the terminal device 21a.

The object 21b may transmit a resource operation request to the service node 20a based on the object token. The resource operation request is configured to request to operate resource data within the scope of authority through the service node 20a. The resource data within the scope of authority may belong to object resource information in synchronization data. The resource data within the scope of authority may be object resource information belonging to the object 21b in the object resource information. In this way, the service node 20a may provide, based on the object token, the application client with an operation permission for the resource data within the scope of authority. Therefore, the resource data within the scope of authority may be object resource information that belongs to the object 21b in the object resource information and for which the object 21b has an operation permission.

In some embodiments, the service node 20a may further be configured to provide an object registration service. The object 21b may transmit an object registration request to the service node 20a through the application client. In this way, the service node 20a may receive the object registration request transmitted by the object 21b through the application client, and invoke an object registration service based on the object registration request, to obtain object registration information entered by the object 21b in the object registration service, and further, package the object registration information through the consensus node 20c. After the consensus node 20c successfully performs on-chain of the object registration information, the service node 20a may obtain latest object credential information from a blockchain maintained by consensus node 20c. The latest object credential information may include the object registration information of the object 21b. The object registration information may include an object registration identifier and an object registration password.

In view of the above, in embodiments of this application, the service node in the blockchain network may be used as an authorization server. The authorization server may respond, through an object login service, to an authorization request transmitted by the application client, and respond, through the token transmitting service, to a token obtaining request transmitted by the application client, to implement a login operation on the application client. There may be a plurality of service nodes, and the plurality of service nodes may respectively respond to the authorization request and the token obtaining request transmitted by the application client, thereby improving the efficiency and stability of logging in to the application client by the target object.

Further, FIG. 3 is a schematic flowchart of a data processing method according to an embodiment of this application. The method may be performed by a service node in a blockchain network. The service node may be a server connected to a service network or a terminal device connected to the service network. A specific form of the service node is not limited herein. The service node is configured to provide an object login service and a token issuance service. The service node may be any node in the service network 100a shown in FIG. 1, for example, the node 110a. The data processing method may include the following operations:

Operation S101: Receive an authorization request transmitted by a target object through an application client, invoke the object login service based on the authorization request, and obtain to-be-verified login information entered by the target object in the object login service. The to-be-verified login information is also referred to as "verification-target login information" or simply "target login information."

Specifically, the service node may receive the authorization request transmitted by the target object through the application client, invoke an object login front-end based on the authorization request, and obtain the to-be-verified login information entered by the target object in the object login front-end. The service node may display the object login front-end in the application client, for the target object to enter the to-be-verified login information in the object login front-end. The object login service includes the object login front-end (that is, a user login front-end) and an object login back-end. The object login front-end may represent a front-end page of the object login service, and the object login back-end may represent back-end logic of the object login service.

The to-be-verified login information may be login information of the target object in another application client (for example, a target application client) other than a third-party application. In this way, the object login front-end may represent a front-end page of the target application client, and the object login back-end may represent back-end logic of the target application client. Therefore, the service node may cause the third-party application to jump to the object login front-end, and the target object interacts with the object login front-end, to implement a login operation on the third-party application through the login information in the target application client. The target object may directly enter the to-be-verified login information in the object login front-end, or may be authorized to obtain the to-be-verified login information in the object login front-end. The to-be-verified login information authorized to be obtained may be to-be-verified login information entered by the target object at a moment before the current moment.

The service node may obtain object management information from a consensus node of the blockchain network. The object management information may include object credential information and object resource information. The service node may obtain an object management contract from the consensus node. The object management contract may include, but not limited to, a login determining contract, an authorization code verification contract, and a token verification contract. The object credential information and the login determining contract may be configured for performing operation S102. The authorization code verification contract may be configured for performing operation S103. The token verification contract may be configured for performing operation S205. The object resource information may be configured for performing operation S206.

The service node may build an object information database (that is, a user login credential database (DB)), and store the object management information in the object information database. In this way, the object information database may be configured for querying the object credential information in operation S102 and querying the object resource information in operation S206.

The object management contract may be a blockchain smart contract stored in the service node. The blockchain smart contract may be published in a consensus network and synchronized to the service node for execution. Functions, such as user state verification and user login verification acceptance, are encapsulated in the object management contract. The object management contract may rely on the object management information in the object information database to play a role. That is, the object management contract may perform login verification based on the object credential information, and perform CURD (that is, basic atomic operations for processing data, including Create (that is, C), Update (that is, U), Read (that is, R), and Delete (that is, D)) on user information based on the object resource information.

Operation S102: Perform matching of the to-be-verified login information with object credential information through the object login service, and if the to-be-verified login information matches the object credential information, obtain an object authorization code for the target object, and return the object authorization code to the application client.

Specifically, the service node may invoke a login determining contract through the object login back-end, and perform matching of the to-be-verified login information with the object credential information through the login determining contract. The login determining contract is obtained by the service node from the consensus node. Further, if the to-be-verified login information matches the object credential information, the service node may obtain the object authorization code for the target object and return the object authorization code to the application client. In some embodiments, if the to-be-verified login information does not match the object credential information, the service node may reject the authorization request without returning an object authorization code to the application client.

The to-be-verified login information includes a to-be-verified object identifier (also referred to as a "verification-target object identifier" or simply "target object identifier") and a to-be-verified object password (also referred to as a "verification-target object password" or simply "target object password"). A specific process in which the service node performs matching of the to-be-verified login information with the object credential information through the login determining contract may be described as: The service node may obtain the object credential information from the object information database through the login determining contract. The object credential information is obtained by the service node from on-chain data of the consensus node through synchronization. The object credential information may include object identifier credential information. Further, the service node may search the object identifier credential information for the to-be-verified object identifier, and determine, if the object identifier credential information does not include the to-be-verified object identifier, that the to-be-verified login information does not match the object credential information. In some embodiments, if the object identifier credential information includes the to-be-verified object identifier, the service node may determine a matching result between the to-be-verified login information and the object credential information based on the to-be-verified object password.

The object information database does not store a plaintext password, and instead, stores a result of hashing after key salting. Key salting refers to adding a pre-generated character or character string to a random position in the key. For example, a key is: 123456, the system adds a character to the random position, and a result after the addition is: 1a2b3c456abcd. In this way, the object credential information further includes object password credential information (that is, the result of hashing after key salting) and character string credential information (that is, salt), and one piece of object identifier credential information corresponds to one piece of object password credential information and one piece of character string credential information. A specific process in which the service node determines the matching result between the to-be-verified login information and the object credential information based on the to-be-verified object password may be described as: The service node may splice the to-be-verified object password with character string credential information that corresponds to the to-be-verified object identifier and that is in the object credential information, to obtain to-be-verified spliced login information (that is, first to-be-verified spliced login information), that is, splice the to-be-verified object password with the character string credential information to obtain to-be-verified spliced login information. Further, the service node may perform hash calculation on the to-be-verified spliced login information, to obtain to-be-verified hash login information (that is, first to-be-verified hash login information). Further, the service node may compare the to-be-verified hash login information with object password credential information that corresponds to the to-be-verified object identifier and that is in the object credential information, and generate, if the to-be-verified hash login information is the same as the object password credential information that corresponds to the to-be-verified object identifier and that is in the object credential information, a matching result configured to represent that the to-be-verified login information matches the object credential information. In some embodiments, if the to-be-verified hash login information is different from the object password credential information that corresponds to the to-be-verified object identifier and that is in the object credential information, the service node may generate a matching result configured to represent that the to-be-verified login information does not match the object credential information. In this disclosure, the to-be-verified spliced login information is also referred to as "verification-target spliced login information" or simply "target spliced login information," and the to-be-verified hash login information is also referred to as "verification-target hash login information" or simply "target hash login information."

Salt is a randomly generated character string, and is generated by a secure random function. Different object identifier credential information corresponds to different salts. In embodiments of this application, the hash algorithm used for the hash calculation is not limited. For example, the hash algorithm may be an MD5 message-digest algorithm.

In some embodiments, the service node may perform hash calculation on the to-be-verified object password, to obtain a to-be-verified hash object password. Further, the service node may splice the to-be-verified hash object password with the character string credential information that corresponds to the to-be-verified object identifier and that is in the object credential information, to obtain to-be-verified spliced login information (that is, second to-be-verified spliced login information), that is, splice the to-be-verified hash object password with the character string credential information to obtain to-be-verified spliced login information. Further, the service node may perform hash calculation on the to-be-verified spliced login information, to obtain to-be-verified hash login information (that is, second to-be-verified hash login information). In some embodiments, the service node may perform hash calculation on the to-be-verified object password, to obtain to-be-verified hash login information (that is, third to-be-verified hash login information).

In some embodiments, the object information database may further store a plaintext password. In this way, the object credential information further includes object password credential information (that is, the plaintext password). One piece of object identifier credential information corresponds to one piece of object password credential information. A specific process in which the service node determines the matching result between the to-be-verified login information and the object credential information based on the to-be-verified object password may be described as: The service node may compare the to-be-verified object password with object password credential information that corresponds to the to-be-verified object identifier and that is in the object credential information, and generate, if the to-be-verified object password is the same as the object password credential information that corresponds to the to-be-verified object identifier and that is in the object credential information, a matching result configured to represent that the to-be-verified login information matches the object credential information. In some embodiments, if the to-be-verified object password is the different from the object password credential information that corresponds to the to-be-verified object identifier and that is in the object credential information, a matching result configured to represent that the to-be-verified login information does not match the object credential information.

The object management information in the object information database may include an object state. The object state may represent a frozen state or a non-frozen state of the object. When receiving the authorization request transmitted by the application client, the service node may query the object information database through the object login service for an object state of the target object, and reject the authorization request if the object state of the target object is a frozen state. In some embodiments, if the object state of the target object is a non-frozen state, the service node may return the object authorization code to the application client after obtaining the object authorization code for the target object.

Operation S103: Receive a token obtaining request transmitted by the application client based on the object authorization code, invoke the token issuance service based on the token obtaining request, obtain an object token for the target object through the token issuance service, and return the object token to the application client.

Specifically, the service node may receive a token obtaining request transmitted by the application client based on the object authorization code, and invoke the token issuance service based on the token obtaining request. Further, the service node may invoke an authorization code verification contract through the token issuance service, and perform verification on the object authorization code through the authorization code verification contract. The authorization code verification contract is obtained by the service node from the consensus node. Further, if the verification on the object authorization code succeeds, the service node may obtain key authorization information associated with the target object, generate the object token for the target object based on the key authorization information, and return the object token to the application client. In some embodiments, if the verification on the object authorization code fails, the service node may reject the token obtaining request without returning an object token to the application client.

The object authorization code may be configured to represent authorization information corresponding to the target object. That is, the service node may obtain authorization information selected by the target object in the object login service, and generate an object authorization code for the target object based on the authorization information. The authorization information is key authorization information of the target object, including at least one of aging information, an operation permission, or a scope of authority. The aging information is configured to represent a life cycle of the object token. Therefore, the service node may parse the object authorization code, to obtain the key authorization information associated with the target object.

In some embodiments, the object authorization code does not need to represent the key authorization information associated with the target object, and the key authorization information associated with the target object may be obtained through the object authorization code. That is, the service node may obtain the key authorization information selected by the target object in the object login service. The key authorization information includes at least one of aging information, the operation permission, or the scope of authority. The aging information is configured to represent a life cycle of the object token. Therefore, the service node may obtain, from the object login service through the token issuance service, the key authorization information associated with the target object.

The object token may provide an operation permission to the application client for resource data within a scope of authority. That is, the object token may have an operation permission and a scope of authority. In addition, the object token may further have aging information. The resource data may also be referred to as object resource information.

The aging information, the operation permission, and the scope of authority may be selected by the target object in the object login front-end of the object login service. In some embodiments, the aging information, the operation permission, and they scope of authority may also be set by default on the service node. The target object may select any one or more of the aging information, the operation permission, and the scope of authority in the object login front-end, or may not select the aging information, the operation permission, and the scope of authority.

The operation permission means that the application client has a permission to operate resource data through the service node. The operation permission of the target object for the resource data may be a read permission, a write permission, a read-write permission, a delete permission, a modify permission, a read-delete permission, and the like. For example, the read permission means that the target object can perform a read operation on the resource data. The scope of authority may represent that the target object has an operation permission for the resource data. A data type included in the scope of authority is not limited in embodiments of this application. The aging information is configured to represent a life cycle of the object token. For example, the life cycle of the object token may be 1 day.

In embodiments of this application, after obtaining the object credential information from a consensus node of the blockchain network, the service node in the blockchain network receives the authorization request transmitted by the target object through the application client, obtains, through the object login service, the to-be-verified login information entered by the target object, further performs matching of the to-be-verified login information with object credential information, and if the to-be-verified login information matches the object credential information, obtains an object authorization code for the target object, and returns the object authorization code to the application client. Further, the service node may receive a token obtaining request transmitted by the application client based on the object authorization code, obtain an object token for the target object through the token issuance service, and return the object token to the application client. In view of the above, the service node in the blockchain network may be used as an authorization server in an identity management system. The authorization server may obtain, from the consensus node of the blockchain network, the object credential information stored in a distributed manner, and respond, based on the object credential information, an authorization request and a token obtaining request (the authorization request and the token obtaining request may be referred to as a login request) transmitted by the application client. Due to the characteristics of decentralization and self-verification of the blockchain network, a plurality of service nodes may be deployed. A plurality of application clients may transmit login requests to different service nodes respectively. Therefore, when the plurality of application clients transmit the login requests at the same time, the plurality of service nodes can simultaneously respond to a plurality of login requests, thereby improving the efficiency of logging in to the application client by the target object. In addition, because there are one or more service nodes, when one of the service nodes fails, other service nodes may also perform login management without affecting the service logic of the login operation, thereby improving the stability of logging in to the application client by the target object. In addition, the service node may provide, based on the object token, the application client with an operation permission for resource data within a scope of authority. The operation permission enables the application client to operate the resource data through the service node. Therefore, the service node can control the object token at any time while ensuring, through the object token, that the application client obtains the operation permission, thereby ensuring that the operation performed by the application client on the resource data does not endanger the security of the resource data in the identity management system.

In this application, related data, such as a data type, included in a scope of authority may be involved. In a case that the foregoing embodiment of this application is applied to a specific product or technology, a permission or an approval from a user needs to be obtained. In addition, collection, use, and processing of the related data need to comply with relevant laws, regulations, and standards of the country or region in which the data is located.

When the third-party application receives the object token returned by the service node, the third-party application invokes the service node to complete object login of on-chain management, and obtains an object identity indicated by the object credential information. The third-party application may perform a service of the third-party application in subsequent operations after obtaining the object identity indicated by the object credential information. The service of the third-party application represents an inherent function of the third-party application. For example, an instant messaging function is implemented through the object identity indicated by the object credential information. In addition, the object token means that a resource owner authorizes the third-party application to access its resource data stored on the authorization server without providing an account and a password to the third-party application.

For ease of understanding, reference may be made to FIG. 4. FIG. 4 is a schematic flowchart showing applying for a resource according to an embodiment of this application. The schematic flowchart shown in FIG. 4 is a linear procedure. Operation S41 to operation S46 may be executed linearly, operation S41 corresponds to operation S101, operation S42 corresponds to operation S102, and operation S43 to operation S44 correspond to operation S103.

As shown in FIG. 4, the third-party application (that is, a client) may perform operation S41 and request, through operation S41, a resource from the resource owner (that is, the target object transmits an authorization request through the application client (that is, the third-party application)). The resource owner may represent the object indicated by the object credential information, and the resource owner herein may represent the target object indicated by the to-be-verified login information. Further, the resource owner may perform matching of the to-be-verified login information with the object credential information, and perform operation S42 if the to-be-verified login information matches the object credential information, to grant a permission (that is, an authorization code or an authorization grant) to the third-party application through operation S42. The authorization code may also be referred to as an object authorization code. The object authorization code is configured to identify an identity of the target object.

As shown in FIG. 4, the third-party application may perform operation S43, to grant, through operation S43, a permission (that is, the object authorization code) to the authorization server (that is, an authentication server or an authorization server) for authentication (that is, the target object transmits a token obtaining request through the application client). The authorization server herein may be the service node in embodiments of this application. Further, if the authentication succeeds, the authorization server may perform operation S44, and return a token (that is, an access token) to the third-party application through operation S44. The tokens may also be referred to as an object token.

Figure 5:
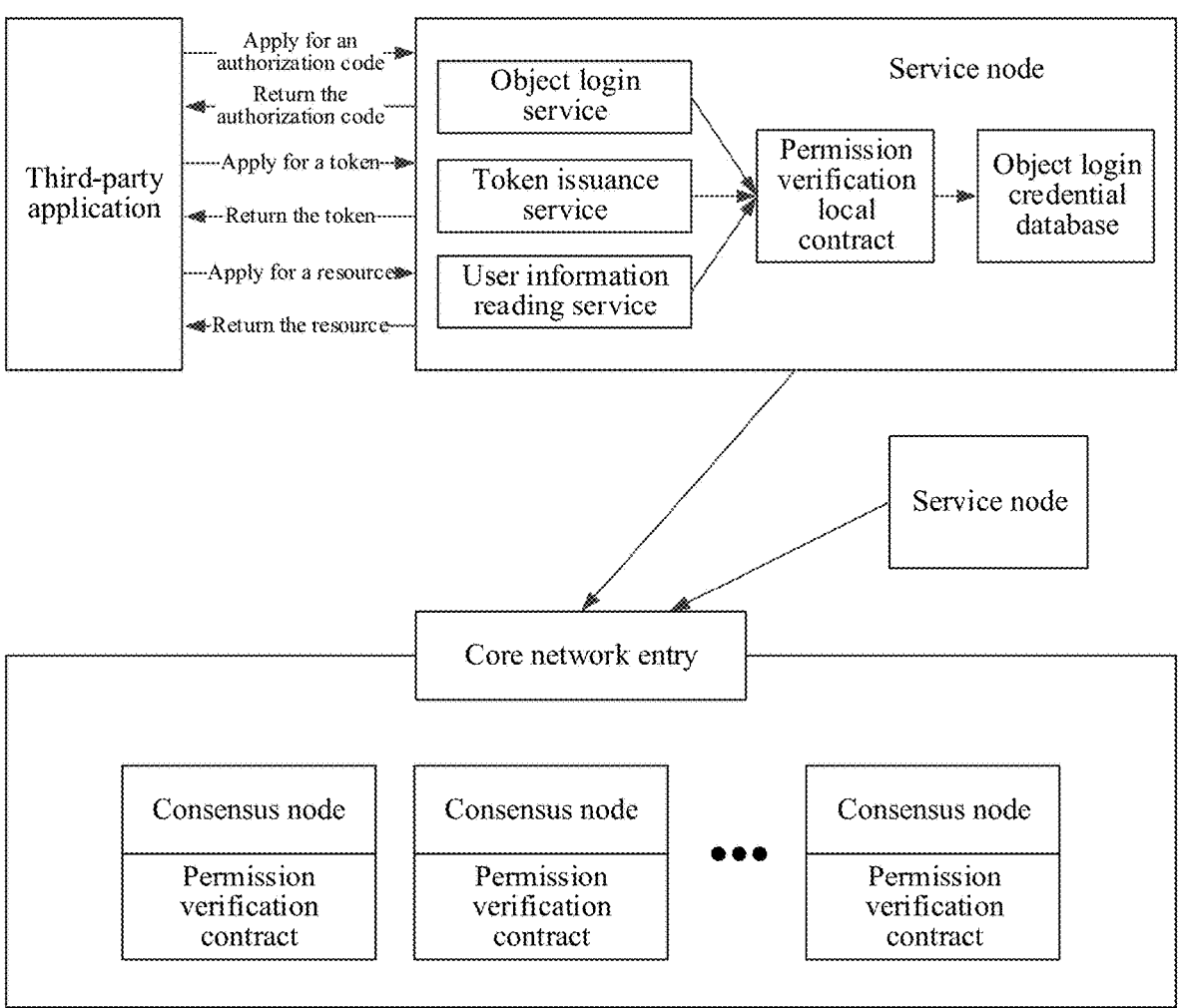
FIG. 5 is a schematic diagram showing a scenario of applying for a resource according to an embodiment of this application.

For case of understanding, reference may be made to FIG. 5. FIG. 5 is a schematic diagram showing a scenario of applying for a resource according to an embodiment of this application. Applying for an authorization code shown in FIG. 5 corresponds to operation S41 in the embodiment corresponding to FIG. 4, and returning the authorization code shown in FIG. 5 corresponds to operation S42 in the embodiment corresponding to FIG. 4, applying for a token shown in FIG. 5 corresponds to operation S43 in the embodiment corresponding to FIG. 4, and returning the token shown in FIG. 5 corresponds to operation S44 in the embodiment corresponding to FIG. 4.

As shown in FIG. 5, a permission verification contract may be stored in the consensus node of the blockchain network, and the permission verification contract may be a smart contract deployed on the consensus node. The service node in the blockchain network may obtain a permission verification local contract (that is, the object management contract) and object management information from the consensus node of the blockchain network through a core network entry (that is, the proxy node), and further, store the object management information in an object login credential database (that is, the object information database). The permission verification local contract may include, but not limited to, the foregoing login determining contract, an authorization code verification contract, and a token verification contract. The object management information may include object credential information and object resource information.

As shown in FIG. 5, the third-party application may apply for an authorization code (that is, transmit an authorization request) from the service node. In this way, the service node may respond to the authorization request through an object login service, invoke a login determining contract through the object login service, and return the authorization code (that is, return the object authorization code) to the third-party application through the login determining contract and the object management information in the object login credential database.

As shown in FIG. 5, the third-party application may apply for a token (that is, transmit a token obtaining request) from the service node. In this way, the service node may respond to the token obtaining request through a token issuance service, invoke an authorization code verification contract through the token issuance service, and return the token (that is, return the object token) to the third-party application through the authorization code verification contract and the object management information in the object login credential database.

The blockchain network may include a plurality of consensus nodes. A quantity of consensus nodes herein is not limited in embodiments of this application. The blockchain network may include a plurality of service nodes. A quantity of service nodes herein is not limited in embodiments of this application. Because a plurality of service nodes and a plurality of consensus nodes are deployed, the same service node may transmit a data synchronization request to different consensus nodes, and different application clients may transmit login requests (that is, authorization requests and token obtaining requests) to different service nodes.

For example, when there are two third-party applications, the two third-party applications may be specifically a third-party application X1 and a third-party application X2, and the plurality of service nodes may specifically include a service node J1 and a service node J2. In this way, the third-party application X1 may transmit a login request to the service node J1, and the third-party application X2 may transmit a login request to the service node J2. In some embodiments, the third-party application X1 may transmit a login request to the service node J2, and the third-party application X2 may transmit a login request to the service node J1.

When receiving the authorization request and token obtaining request transmitted by the application client, the service node may generate local information irrelevant to the blockchain, and then, store the local information into the object information database. The local information may represent information generated by the service node when serving as the authorization server. For example, the local information may be a login time (that is, a time at which the service node obtains the to-be-verified login information entered by the target object in the object login service) of the application client.

In view of the above, the service node in the blockchain network may be used as an authorization server in an identity management system. The authorization server may obtain, from the consensus node of the blockchain network, the object credential information stored in a distributed manner, and respond, based on the object credential information, an authorization request and a token obtaining request (the authorization request and the token obtaining request may be referred to as a login request) transmitted by the application client. Due to the characteristics of decentralization and self-verification of the blockchain network, a plurality of service nodes may be deployed. A plurality of application clients may transmit login requests to different service nodes respectively. Therefore, when the plurality of application clients transmit the login requests at the same time, the plurality of service nodes can simultaneously respond to a plurality of login requests, thereby improving the efficiency of logging in to the application client by the target object. In addition, because there are one or more service nodes, when one of the service nodes fails, other service nodes may also perform login management without affecting the service logic of the login operation, thereby improving the stability of logging in to the application client by the target object. In addition, the service node may provide, based on the object token, the application client with an operation permission for resource data within a scope of authority. The operation permission enables the application client to operate the resource data through the service node. Therefore, the service node can control the object token at any time while ensuring, through the object token, that the application client obtains the operation permission, thereby ensuring that the operation performed by the application client on the resource data does not endanger the security of the resource data in the identity management system.

Further, FIG. 6 is a schematic flowchart of a data processing method according to an embodiment of this application. The method may be performed by a service node in a blockchain network. The service node may be a server connected to a service network or a terminal device connected to the service network. A specific form of the service node is not limited herein. The service node is configured to provide an object login service, a token issuance service, and an object information operation service. The service node may be any node in the service network 100*a* shown in FIG. 1, for example, the node 110*a*. The data processing method may include the following operations:

Operation S201: Receive an authorization request transmitted by a target object through an application client, invoke the object login service based on the authorization request, and obtain to-be-verified login information entered by the target object in the object login service.

For a specific process in which the service node obtains the to-be-verified login information entered by the target object in the object login service, reference may be made to the description of operation S101 in the embodiment corresponding to FIG. 3, and details are not described herein again.

The application client may encrypt the authorization request through the node public key of the service node, obtain an encrypted authorization request, and transmit the encrypted authorization request to the service node. In this way, the service node may receive the encrypted authorization request transmitted by the application client, and decrypt the encrypted authorization request through the node private key of the service node, to obtain the authorization request.

Operation S202: Perform matching of the to-be-verified login information with object credential information through the object login service, and if the to-be-verified login information matches the object credential information, obtain an object authorization code for the target object, and return the object authorization code to the application client.

For a specific process in which the service node obtains the object authorization code for the target object, reference may be made to the description of operation S102 in the embodiment corresponding to FIG. 3, and details are not described herein again.

The service node may encrypt the object authorization code through the node private key of the service node, to obtain an encrypted object authorization code, and return the encrypted object authorization code to the application client. In this way, the application client may receive the encrypted object authorization code returned by the service node, and decrypt the encrypted object authorization code through the node public key of the service node, to obtain the object authorization code.

Operation S203: Receive a token obtaining request transmitted by the application client based on the object authorization code, invoke the token issuance service based on the token obtaining request, obtain an object token for the target object through the token issuance service, and return the object token to the application client.

For a specific process in which the service node obtains the object token for the target object, reference may be made to the description of operation S103 in the embodiment corresponding to FIG. 3, and details are not described herein again.

For a specific process in which the service node receives the token obtaining request, reference may be made to the foregoing description of receiving the authorization request, and details are not described herein again. For a specific process in which the service node returns the object token, reference may be made to the foregoing description of returning the object authorization code, and details are not described herein again.

Different application clients may transmit authorization requests and token obtaining requests to different service nodes. The application client may determine, from the plurality of service nodes, based on distances between the application client and the service nodes, the target service node for transmitting the authorization request and the token obtaining request. For example, the application client may determine a service node with the shortest distance in the plurality of service nodes as the target service node. In some embodiments, the application client may also determine, from the plurality of service nodes, according to a node scheduling algorithm, the target service node for transmitting the authorization request and the token obtaining request. For example, when needing to transmit the authorization request and token obtaining request, the application client may transmit a node scheduling request to a scheduling server that performs node scheduling, to cause the scheduling server to schedule the target service node for the application client according to factors such as real-time network quality of the plurality of service nodes, thereby improving the accuracy of scheduling of the service nodes.

Therefore, the service node may store object management information associated with all objects. In some embodiments, the service node does not need to store object management information associated with all objects. Likewise, the service node may store both object credential information and object resource information associated with the target object. In some embodiments, the service node may also store object credential information or object resource information associated with the target object. Likewise, the service node may store all object resource information associated with the target object. In some embodiments, the service node may also store partial object resource information associated with the target object.

Operation S204: Receive a resource operation request transmitted by the application client based on the object token, and invoke the object information operation service based on the resource operation request.

The OAuth 2.0 authorization mechanism is used in the manner of transmitting the resource operation request based on the object token used in this application. The authorization mechanism may be configured to authorize a third-party application (that is, the application client) to operate resource data. A resource owner (that is, the target object) of the resource data informs the service node of agreeing to authorize the third-party application to access the system and obtain the resource data corresponding to the target object. Therefore, the service node generates an object token that allows the third-party application to access the service node, and replaces the password with the object token for use by the third-party application.

The object token and the password have the same function, both for accessing the system. However, there are three differences: (1) The object token is short-term. After the life cycle of the object token expires, the object token automatically becomes invalid. The target object cannot modify the aging information of the object token. The password is generally valid in a long term. If the target object does not change password, the password does not change. (2) The object token may be revoked by the resource owner at any time. If the object token is revoked by the resource owner, the object token becomes invalid immediately. The password is generally not allowed to be revoked by others. (3) The object token has an operation permission. For a network service, a read-only token (that is, an object token with a read permission) is more secure than a read-write token (that is, an object token with a read-write permission). For example, the read permission allows the third-party application to read resource data but not write resource data. The password generally means full permissions (that is, the password). (4) The object token has a scope of authority, and the object token has an operation permission for a data type included in the scope of authority. The password has operation permissions for all data types.

The third-party application may log, through the object token, in to a service system indicated by the service node (that is, the resource operation request transmitted to the service node based on the object token). The service system generally does not reconfirm the identity of the third-party application again. Therefore, the third-party application needs to keep the object token confidential. A consequence of leaking the object token is the same as that of leaking the password. Therefore, to ensure the security of resource data in the service system, the service node may set the aging information of the object token to a short time, for example, 1 hour.

The resource operation request further carries an object identifier of the target object. The object identifier of the target object allows the target object to operate resource data corresponding to the target object, but not operate resource data corresponding to another object.

Operation S205: Invoke a token verification contract through the object information operation service, and perform verification on the resource operation request and the object token through the token verification contract.

Specifically, the service node may obtain key authorization information associated with the object token based on the token verification contract, and determine whether the resource operation request meets the key authorization information. Further, if the resource operation request meets the key authorization information, the service node may determine that the verification on the resource operation request and the object token succeeds. In some embodiments, if the resource operation request does not meet the key authorization information, the service node may determine that the verification on the resource operation request and the object token fails.

The token verification contract may determine whether the resource operation request meets the aging information, the operation permission, and the scope of authority. If the resource operation request meets the aging information, the operation permission, and the scope of authority, the service node may determine whether the resource operation request meets the key authorization information. In some embodiments, if the resource operation request does not meet the aging information, the operation permission, or the scope of authority, the service node may determine that the resource operation request does not meet the key authorization information. For example, if the resource operation request is a resource reading operation request, and the operation permission is a write permission, the service node may determine that the resource operation request does not meet the operation permission. In another example, if a request time corresponding to the resource operation request exceeds the life cycle of the object token, the service node may determine that the resource operation request does not meet the aging information. In another example, if a data type requested by the resource operation request to be operated is different from a data type included in the scope of authority, the service node may determine that the resource operation request does not meet the scope of authority.

When receiving the resource operation request transmitted by the application client, the service node may query the object information database through the object information operation service for an object state of the target object, and reject the resource operation request if the object state of the target object is a frozen state. In some embodiments, if the object state of the target object is a non-frozen state, the service node may perform operation S206 or operation S207 based on a verification result of the resource operation request and the object token.

When the verification on the resource operation request and the object token succeeds or fails, the service node may perform different operations. If the verification on the resource operation request and object token succeeds, the service node may perform operation S206. In some embodiments, if the verification on the resource operation request and object token fails, the service node may perform operation S207.

Operation S206: Respond to the resource operation request through the object information operation service if the verification on the resource operation request and the object token succeeds.

If the resource operation request is a resource reading operation request, the service node may obtain, from an object information database through the object information operation service, target read data requested by the resource reading operation request to be read. The target read data belongs to the resource data. Further, the service node may return the target read data to the application client.

If the object information database includes the target read data requested by the resource reading operation request to be read, the service node may obtain the target read data from the object information database through the object information operation service. In some embodiments, if the object information database does not include the target read data, a data synchronization request for the target read data is transmitted through the object information operation service to the consensus node, synchronization data is obtained from on-chain data of the consensus node based on the data synchronization request for the target read data, the synchronization data is stored into the object information database, and the target read data is obtained from the object information database through the object information operation service. The synchronization data includes the target read data.

In some embodiments, if the resource operation request is a resource writing operation request, the service node may write, through the object information operation service, target write data requested by the resource writing operation request to be written. The target write data belongs to the resource data. Further, if the object information database does not include the target write data, the service node may write the target write data into the object information database. In some embodiments, if the object database includes the target write data, the service node may not respond to a resource accessing operation request.

If the object information database does not include the target write data, the service node may forward the target write data to the consensus node, to cause the consensus node to package the target write data, generate a target block (that is, a first target block), and add the target block to the blockchain network. Further, the service node may transmit a data synchronization request for the target write data to the consensus node, receive the target write data returned by the consensus node based on the data synchronization request for the target write data, and write the target write data into the object information database. The target write data is obtained by the consensus node from the target block.

In some embodiments, if the resource operation request is a resource updating operation request, the service node may obtain, through the object information operation service, initial update data requested by the resource updating operation request to be updated. Further, if the object information database includes the initial update data, the service node may update the initial update data through target update data in the resource updating operation request. In some embodiments, if the object information database does not include the initial update data, the service node may write target update data in the resource updating operation request into the object information database. In some embodiments, if the object information database does not include the initial update data, the service node does not need to respond to the resource updating operation request. The initial update data and the target update data both belong to the resource data.

If the object information database includes the initial update data, the service node may forward the target update data in the resource updating operation request to the consensus node, to cause the consensus node to package the target update data, generate a target block (that is, a second target block), and add the target block to the blockchain network. Further, the service node may transmit a data synchronization request for the target update data to the consensus node, receive the target update data returned by the consensus node based on the data synchronization request for the target update data, and update the initial update data in the object information database with the target update data. The target update data is obtained by the consensus node from the target block.

For a specific process in which the service node writes the target update data in the resource updating operation request into the object information database, reference may be made to the description of writing the target write data in the resource writing operation request into the object information database, and details are not described herein again.

In some embodiments, if the resource operation request is a resource deleting operation request, the service node may delete, through the object information operation service, target delete data requested by the resource deleting operation request to be deleted. The target delete data belongs to the resource data. Further, if the object information database includes the target delete data, the service node may delete the target delete data from the object information database. In some embodiments, if the object information database does not include the target delete data, the service node does not need to respond to the resource deleting operation request.

If the object information database includes the target delete data, the service node may delete the target delete data through a delete function in a contract, and if the delete function in the contract is executed successfully (that is, the consensus node recognizes the contract task of deleting the target delete data), receive a delete instruction returned by the consensus node, and delete the target delete data from the object information database based on the delete instruction.

For a specific process in which the service node receives the resource operation request, reference may be made to the foregoing description of receiving the authorization request, and details are not described herein again. The resource operation request may include target write data, target delete data, or target update data. For a specific process in which the service node returns the target read data, reference may be made to the foregoing description of returning the object authorization code, and details are not described herein again.

The target read data obtained from the on-chain data of the consensus node, the target write data obtained from the first target block, and the target update data obtained from the second target block may all be referred to as synchronization data obtained by the service node from the consensus node.

The target read data may be obtained by the service node from a third target block stored in the consensus node, and there may be one or more first target blocks, one or more second target blocks, and one or more third target blocks. That is, the service node may obtain the target write data from the one or more first target blocks, the service node may obtain the target update data from the one or more second target blocks, and the service node may obtain the target read data from the one or more third target blocks. In other words, the target write data, the target update data, and the target read data may be packaged into one or more target blocks respectively.

For ease of understanding, in embodiments of this application, descriptions are provided by using an example in which the target write data, the target update data, and the target read data are all respectively packaged into a same target block. Descriptions are provided by using an example in which the target write data is packaged into a target block Q. Block information of the target block Q may include a block header (that is, block header information) and a block body (that is, a block main body or block body information). The block header may include information, such as a parent block hash value (that is, parent block hashing), a block height, a version number, a timestamp, a difficulty value, a random number, and a Merkle tree root (that is, block hashing or a block hash value), of the target block Q. The block body may include a Merkle path constituted by exchange data packaged into the target block Q and an exchange hash value of the exchange data.

For ease of understanding, descriptions are provided herein by using an example in which four pieces of exchange data are packaged into the target block Q. The four pieces of exchange data herein may be exchange data 1, exchange data 2, exchange data 3, and exchange data 4. Exchange hash conversion may be performed on the four pieces of exchange data to obtain exchange hash values corresponding to the exchange data. For example, an exchange hash value of the exchange data 1 may be an exchange hash value 1 (for example, Hash1), an exchange hash value of the exchange data 2 may be an exchange hash value 2 (for example, Hash2), an exchange hash value of the exchange data 3 may be an exchange hash value 3 (for example, Hash3), and an exchange hash value of the exchange data 4 may be an exchange hash value 4 (for example, Hash4). For example, the target write data may be the exchange data 3 and the exchange data 4 in the target block Q.

The consensus node may obtain Merkle proof information corresponding to the target write data. The Merkle proof information herein may be constituted by exchange hash values in the Merkle path. For example, Hash12 (that is, a hash value generated based on Hash1 and Hash2 and representing a hash value obtained by hashing a result of splicing Hash1 and Hash2) and Hash1234 (that is, a hash value generated based on Hash12 and Hash34, Hash34 being a hash value generated based on Hash3 and Hash4) herein may be used as path hash values, for forming the Merkle proof information based on the path hash values. Further, the consensus node may use the target write data, the Merkle proof information, and the block header of the target block Q as the synchronization data returned to the service node.

After receiving the synchronization data, the service node may perform verification on the synchronization data based on the target write data, the Merkle proof information, and the block header of the target block Q. Specifically, the service node may determine, based on the exchange hash value corresponding to the target write data and the Merkle proof information corresponding to the path hash values, a to-be-compared tree root corresponding to the target block Q. Further, the service node may obtain a verification result of the target block Q based on the to-be-compared tree root and the Merkle tree root in the block header of the target block Q. If the to-be-compared tree root is the same as the Merkle tree root in the block header of the target block Q, the verification result indicates that the verification succeeds. Further, if the verification result indicates that the verification succeeds, the service node may synchronize the block header of the target block Q to the block header chain of the service node, and write the target write data into the object information database.

Operation S207: Reject the resource operation request through the object information operation service if the verification on the resource operation request and the object token fails.

Referring to FIG. 4 again, as shown in FIG. 4, the third-party application may perform operation S45, and obtain, through operation S45, from a resource server, by using the token (that is, the object token), resource data (that is, protected resource) corresponding to the token (that is, the target object transmits a resource operation request through the application client). The resource server herein may be the service node in embodiments of this application. Further, the resource server may perform operation S46, and return the protected resource (for example, the target read data) to the third-party application through operation S46. The resource data is a resource of the resource owner, and the resource owner cannot obtain resource data of another object.

In embodiments of this application, the service node may be used as the authorization server and the resource server. When the service node receives the authorization request and the token obtaining request, the service node may be used as the authorization server. When the service node receives the resource operation request, the service node may be used as the resource server. The authorization server and the resource server that correspond to the third-party application may be the same. That is, the third-party application may transmit an authorization request, a token obtaining request, and a resource operation request to a same service node. In some embodiments, the authorization server and the resource server that correspond to the third-party application may be different. That is, the third-party application may transmit an authorization request, a token obtaining request, and a resource operation request to different service nodes.

Referring to FIG. 5 again, applying for a resource shown in FIG. 5 corresponds to operation S45 in the embodiment corresponding to FIG. 4, and returning the resource shown in FIG. 5 corresponds to operation S46 in the embodiment corresponding to FIG. 4. As shown in FIG. 5, the third-party application may apply for a resource (that is, transmit the resource operation request) from the service node. In this way, the service node may respond to the resource operation request through a user information reading service (that is, the object information operation service), invoke a token verification contract through the user information reading service, and return the resource (that is, return the target read data) to the third-party application through the token verification contract and the object management information in the object login credential database.

When the resource operation request is a resource reading operation request, the service node needs to return a resource to the third-party application. When the resource operation request is a resource writing operation request, a resource updating operation request, and resource deleting operation request, the service node does not need to return a resource to the third-party application.

Figure 7:
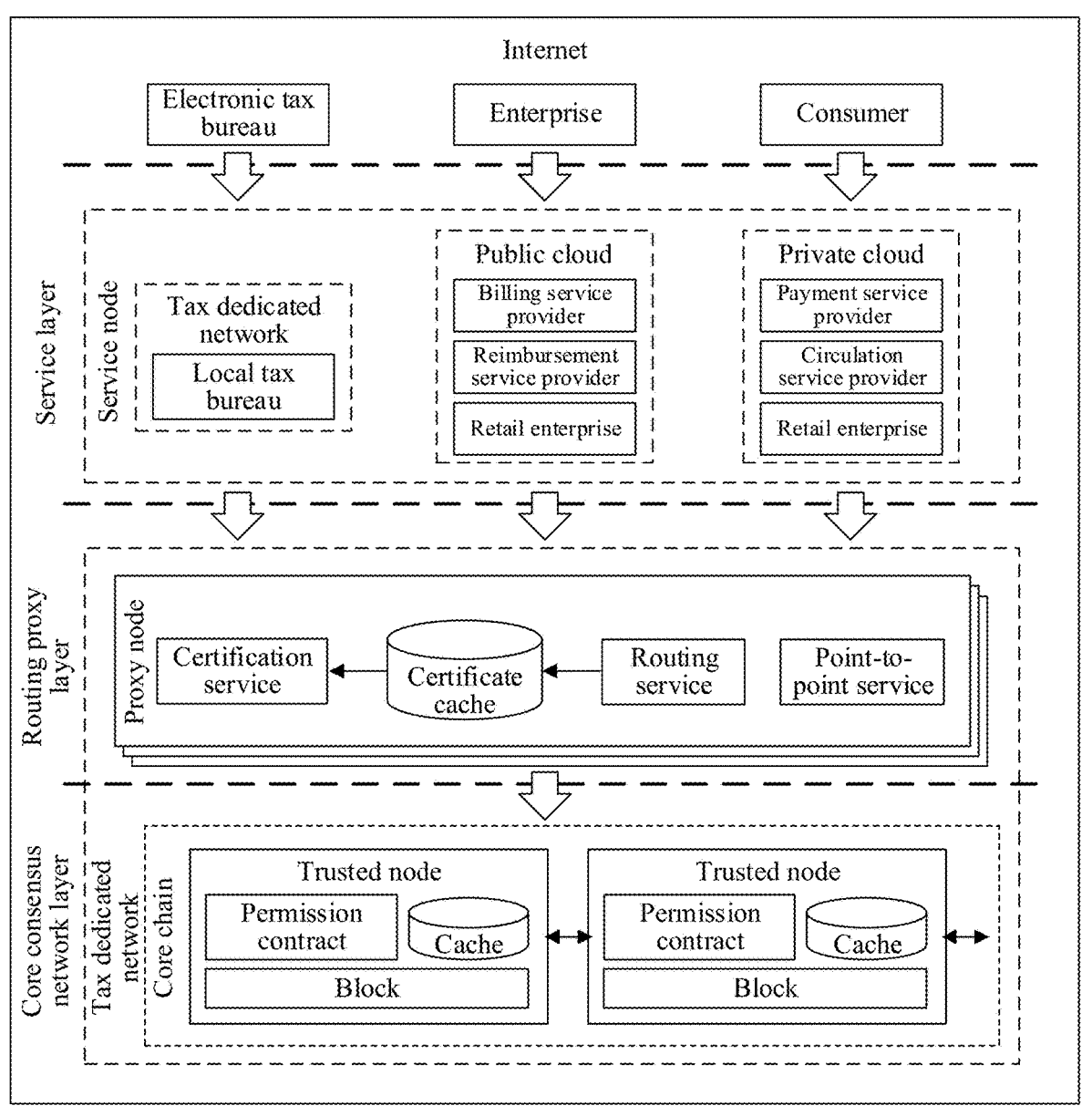
FIG. 7 is a diagram showing a system architecture in a blockchain electronic bill scenario according to an embodiment of this application.

For ease of understanding, reference may be made to FIG. 7. FIG. 7 is a diagram showing a system architecture in a blockchain electronic bill scenario according to an embodiment of this application. As shown in FIG. 7, a service layer, a routing proxy layer, and a core consensus network layer in embodiments of this application form an entire blockchain service system. The routing proxy layer implements a quarantine function for the service layer and the core consensus network layer. For case of understanding, an example of the exchange service in embodiments of this application may be an electronic bill transfer service, which is not limited herein.

When a blockchain is used in a tax system or another scenario, to improve confidentiality and security of data, a hierarchical blockchain structure, "service network-core consensus network," in embodiments of this application may be used when data related to personal privacy, team security, or the like is involved in the blockchain system. The blockchain network may record exchange information generated during the entire circulation process of an electronic bill. The circulation process of the electronic bill includes processes such as claiming the electronic bill, issuing the electronic bill, reimbursing the electronic bill, and filing tax of the electronic bill.

The service layer is located in a witness network and may submits service operation interaction to the core consensus network layer. Service nodes (for example, the first service node) in the service layer may include a terminal device corresponding to an electronic tax bureau, a terminal device corresponding to an enterprise, and a terminal device corresponding to a consumer user (that is, a consumer). The electronic tax bureau may be a local tax bureau in a tax bureau private network, and the enterprise may be a billing service provider, a reimbursement service provider, or a retail enterprise (for example, a KA enterprise, that is, a large retail customer and a key retail customer enterprise), or the like in a public cloud. The consumer user may be a payment service provider, a circulation service provider, a retail enterprise, or the like in a private cloud.

For example, the bill transfer service performed by the first service node (for example, a terminal device A corresponding to a consumer user) may be transferring an electronic bill (for example, an electronic bill X) obtained by the consumer user when purchasing equipment to a terminal device B corresponding to an enterprise in which the consumer user is located. Certainly, the service layer may further include a second service node. For example, two bill tellers (for example, an employee 1 and an employee 2) from two companies issue bills on their respective terminal devices, which generates some exchange data. For example, the employee 1 may use a terminal device A1 to perform an exchange service, to generate corresponding exchange data, and the employee 2 may use a terminal device A2 to perform an exchange service, to generate corresponding exchange data.

A proxy node in the routing proxy layer may be configured to perform network quarantine on the service layer and the core consensus network layer. The proxy node may have a point-to-point service (that is, a P2P service), a routing service, a certificate cache, and a certification service. The point-to-point service refers to a service in a P2P network. Based on a special type of network protocols, network states of network nodes in the P2P network do not need to be maintained by a central node, and instead, each node broadcasts to and interacts with neighboring nodes to maintain node states of the entire network or connection states of its neighboring nodes. The routing service is a basic function of the node, and is configured for communication between nodes. A certificate associated with the certificate cache may refer to a public key infrastructure (PKI). In the PKI, a certificate is an identity certificate of an owner of a public key and is issued by a certificate authority (CA). Based on the PKI, asymmetric encryption and digital signature for information can be achieved. The PKI herein may include a public and private key password, an x509 certificate, a CA certificate issuance center, and the like. The certification service may be configured to perform verification on a data format of received data, legality of a node, and the like.

In embodiments of this application, the proxy node may forward, to the consensus node (that is, the target consensus node) in the core consensus network layer, the data synchronization request transmitted by the service node (that is, the target service node) in the service layer, or may forward, to the service node in the service layer, the synchronization data returned by the consensus node in the core consensus network layer. During the forwarding, the proxy node may encrypt the forwarded data.

The core consensus network layer may include a plurality of core chains. Each core chain may include one or more consensus nodes. For case of understanding, in embodiments of this application, descriptions are provided by using an example in which the core consensus network layer includes a core chain shown in FIG. 7. A consensus node (that is, a bookkeeping node) in the core consensus network layer may be a trusted node (that is, a TrustSQL node) in the tax private network. The consensus nodes may include a permission contract, a cache, a data block (that is, a block). The permission contract stores circulation logic for an entire life cycle of an electronic bill, for example, a bill state of the electronic bill, a circulation process, an access permission for data, a condition for claiming the electronic bill, and a condition for issuing the electronic bill. The cache and the data block may provide support for adding exchange information to the blockchain and querying for the exchange information.

Each consensus node has a capability of packaging and producing a block, that is, may perform verification on exchange data forwarded by the proxy node and add the exchange data to the exchange pool (that is, the cache shown in FIG. 7) of the consensus node when the verification succeeds Further, the consensus node may package exchange data in the exchange pool thereof and produce a block, to successfully write the block into the blockchain in the core consensus network layer. In addition, when receiving the data synchronization request forwarded by the proxy node, the consensus node may determine, on the blockchain, the synchronization data for returning to the service node.

In view of the above, embodiments of this application provide a distributed identity management system based on a blockchain. The identity management system may extend functions of a service node in the blockchain network. The service node may represent, based on object credential information and object resource information, the blockchain as an authorization server and a resource server for the distributed object management, which implements an object login service, a token issuance service, and an object information operation service that are distributed, eliminates the problem of untrustworthiness brought by centralized identity management, improves the efficiency and stability of logging in to an application client by a target object, and improves the efficiency and stability of operating resource data by the target object through the application client. When the service node is used as the authorization server, the service node may receive an authorization request and a token obtaining request transmitted by the application client, and return an object authorization code and an object token for the target object to the application client. When the service node is used as the resource server, the service node may receive a resource operation request transmitted by the application client and respond to the resource operation request. In embodiments of this application, on-chain management of the object credential information and the object resource information can be implemented, and synchronization and verification are performed on-chain data through the service node, to ensure the real-time, the accuracy, and the non-tamperability of the object credential information and the object resource information are synchronized from the blockchain, thereby ensuring the security of object management information.

Figures 8, 9:
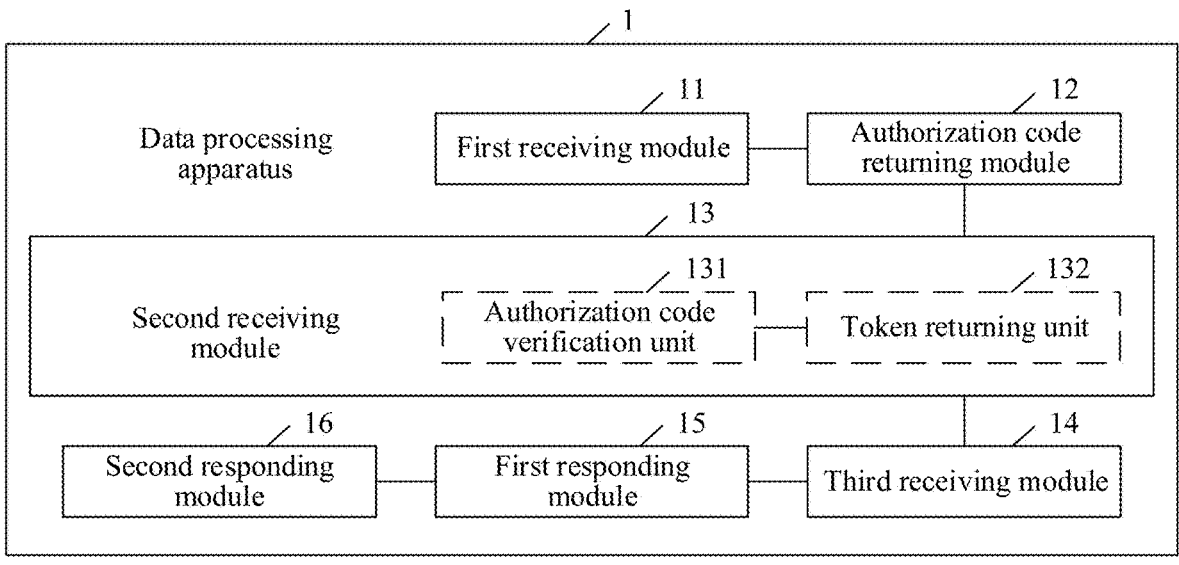
FIG. 8 is a schematic structural diagram of a data processing apparatus according to an embodiment of this application.
FIG. 9 is a schematic structural diagram of a computer device according to an embodiment of this application.

Further, FIG. 8 is a schematic structural diagram of a data processing apparatus according to an embodiment of this application. A data processing apparatus 1 may be a computer program (including program code) run on a computer device. For example, the data processing apparatus 1 may be application software. The data processing apparatus 1 may be configured to perform the corresponding operations in the method shown provided in the embodiments of this application. As shown in FIG. 8, the data processing apparatus 1 is applicable to a service node in a blockchain network. The service node is configured to provide an object login service and a token issuance service. The service node may be the service node 20a in the embodiment corresponding to FIG. 2. The data processing apparatus 1 may include a first receiving module 11, an authorization code returning module 12, and a second receiving module 13. Further, the data processing apparatus 1 may further include a third receiving module 14, a first responding module 15, and a second responding module 16.

The first receiving module 11 is configured to receive an authorization request transmitted by a target object through an application client, invoke the object login service based on the authorization request, and obtain to-be-verified login information entered by the target object in the object login service.

The authorization code returning module 12 is configured to perform matching of the to-be-verified login information with object credential information through the object login service, and if the to-be-verified login information matches the object credential information, obtain an object authorization code for the target object, and return the object authorization code to the application client. The object credential information is obtained by the service node from a consensus node of the blockchain network.

The object login service includes an object login front-end and an object login back-end.

The first receiving module 11 is specifically configured to receive the authorization request transmitted by the target object through the application client, invoke the object login front-end based on the authorization request, and obtain the to-be-verified login information entered by the target object in the object login front-end.

The authorization code returning module 12 is specifically configured to invoke a login determining contract through the object login back-end, and perform matching of the to-be-verified login information with the object credential information through the login determining contract. The login determining contract is obtained by the service node from the consensus node.

The to-be-verified login information includes a to-be-verified object identifier and a to-be-verified object password.

The authorization code returning module 12 is specifically configured to obtain the object credential information from an object information database through the login determining contract. The object credential information is obtained by the service node from on-chain data of the consensus node through synchronization. The object credential information includes object identifier credential information.

The authorization code returning module 12 is specifically configured to search the object identifier credential information for the to-be-verified object identifier, and determine, if the object identifier credential information does not include the to-be-verified object identifier, that the to-be-verified login information does not match the object credential information.

The authorization code returning module 12 is specifically configured to determine, if the object identifier credential information includes the to-be-verified object identifier, a matching result between the to-be-verified login information and the object credential information based on the to-be-verified object password.

The object credential information further includes object password credential information and character string credential information. One piece of object identifier credential information corresponds to one piece of object password credential information and one piece of character string credential information.

The authorization code returning module 12 is specifically configured to splice the to-be-verified object password with character string credential information that corresponds to the to-be-verified object identifier and that is in the object credential information, to obtain to-be-verified spliced login information.

The authorization code returning module 12 is specifically configured to perform hash calculation on the to-be-verified spliced login information, to obtain to-be-verified hash login information.

The authorization code returning module 12 is specifically configured to compare the to-be-verified hash login information with object password credential information that corresponds to the to-be-verified object identifier and that is in the object credential information, and generate, if the to-be-verified hash login information is the same as the object password credential information that corresponds to the to-be-verified object identifier and that is in the object credential information, a matching result configured to represent that the to-be-verified login information matches the object credential information.

The authorization code returning module 12 is specifically configured to generate, if the to-be-verified hash login information is different from the object password credential information that corresponds to the to-be-verified object identifier and that is in the object credential information, a matching result configured to represent that the to-be-verified login information does not match the object credential information.

The second receiving module 13 is configured to receive a token obtaining request transmitted by the application client based on the object authorization code, invoke the token issuance service based on the token obtaining request, obtain an object token for the target object through the token issuance service, and return the object token to the application client. The object token provides an operation permission to the application client for resource data within a scope of authority. The operation permission means that the application client has a permission to operate the resource data through the service node.

The second receiving module 13 includes an authorization code verification unit 131 and a token returning unit 132.

The authorization code verification unit 131 is configured to invoke an authorization code verification contract through the token issuance service, and perform verification on the object authorization code through the authorization code verification contract. The authorization code verification contract is obtained by the service node from the consensus node.

The token returning unit 132 is configured to: if the verification on the object authorization code succeeds, obtain key authorization information associated with the target object, generate the object token for the target object based on the key authorization information, and return the object token to the application client.

The authorization code returning module 12 is specifically configured to obtain key authorization information selected by the target object in the object login service, and generate an object authorization code for the target object based on the key authorization information. The key authorization information includes at least one of the aging information, the operation permission, or the scope of authority. The aging information is configured to represent a life cycle of the object token.

The token returning unit 132 is specifically configured to parse the object authorization code, to obtain the key authorization information associated with the target object.

The second receiving module 13 is specifically configured to obtain key authorization information selected by the target object in the object login service. The key authorization information includes at least one of the aging information, the operation permission, or the scope of authority. The aging information is configured to represent a life cycle of the object token.

The token returning unit 132 is specifically configured to obtain, from the object login service through the token issuance service, the key authorization information associated with the target object.

For specific implementations of the authorization code verification unit 131 and the token returning unit 132, reference may be made to the description of operation S103 in the embodiment corresponding to FIG. 3, and details are not described herein again.

In some embodiments, the service node is further configured to provide an object information operation service.

The third receiving module 14 is configured to receive a resource operation request transmitted by the application client based on the object token, and invoke the object information operation service based on the resource operation request.

The first responding module 15 is configured to invoke a token verification contract through the object information operation service, perform verification on the resource operation request and the object token through the token verification contract, and respond to the resource operation request through the object information operation service if the verification on the resource operation request and the object token succeeds.

The first responding module 15 is specifically configured to obtain key authorization information associated with the object token based on the token verification contract, and determine whether the resource operation request meets the key authorization information.

The first responding module 15 is specifically configured to determine, if the resource operation request meets the key authorization information, that the verification on the resource operation request and the object token succeeds.

The first responding module 15 is specifically configured to determine, if the resource operation request does not meet the key authorization information, that the verification on the resource operation request and the object token fails.

The first responding module 15 is specifically configured to obtain, if the resource operation request is a resource reading operation request, from an object information database through the object information operation service, target read data requested by the resource reading operation request to be read. The target read data belongs to the resource data.

The first responding module 15 is specifically configured to return the target read data to the application client.

The first responding module 15 is specifically configured to obtain the target read data from the object information database through the object information operation service if the object information database includes the target read data requested by the resource reading operation request to be read.

The first responding module 15 is specifically configured to: if the object information database does not include the target read data, transmit a data synchronization request for the target read data through the object information operation service to the consensus node, obtain synchronization data from on-chain data of the consensus node based on the data synchronization request for the target read data, store the synchronization data into the object information database, and obtain the target read data from the object information database through the object information operation service. The synchronization data includes the target read data.

The first responding module 15 is specifically configured to obtain, if the resource operation request is a resource writing operation request, through the object information operation service, target write data requested by the resource writing operation request to be written. The target write data belongs to the resource data.

The first responding module 15 is specifically configured to write the target write data into the object information database if the object information database does not include the target write data.

The first responding module 15 is specifically configured to forward, if the object information database does not include the target write data, the target write data to the consensus node, to cause the consensus node to package the target write data, generate a target block, and add the target block to the blockchain network.

The first responding module 15 is specifically configured to transmit a data synchronization request for the target write data to the consensus node, receive the target write data returned by the consensus node based on the data synchronization request for the target write data, and write the target write data into the object information database.

The second responding module 16 is configured to reject the resource operation request through the object information operation service if the verification on the resource operation request and the object token fails.

For specific implementations of the first receiving module 11, the authorization code returning module 12, and the second receiving module 13, reference may be made to the descriptions of operation S101 to operation S103 in the embodiment corresponding to FIG. 3, and details are not described herein again. For specific implementations of the third receiving module 14, the first responding module 15, and the second responding module 16, reference may be made to the descriptions of operation S204 to operation S207 in the embodiment corresponding to FIG. 6, and details are not described herein again. In addition, the description of beneficial effects of the same method is not described herein again.

Further, FIG. 9 is a schematic structural diagram of a computer device according to an embodiment of this application. As shown in FIG. 9, a computer device 1000 may include a processor 1001, a network interface 1004, and a memory 1005. In addition, the computer device 1000 may further include a user interface 1003 and at least one communication bus 1002. The communication bus 1002 is configured to implement connection and communication between the components. In some embodiments, the user interface 1003 may include a display and a keyboard. The user interface 1003 may further include a standard wired interface and a standard wireless interface. In some embodiments, the network interface 1004 may include a standard wired interface and a standard wireless interface (such as a Wi-Fi interface). The memory 1005 may be a high-speed random access memory (RAM), or may be a non-volatile memory, for example, at least one magnetic disk memory. In some embodiments, the memory 1005 may alternatively be at least one storage apparatus far away from the processor 1001. As shown in FIG. 9, the memory 1005 used as a computer-readable storage medium may include an operating system, a network communication module, a user interface module, and a device control application.

In the computer device 1000 shown in FIG. 9, the network interface 1004 may provide a network communication function. The user interface 1003 is mainly configured to provide an input interface for a user. The processor 1001 may be configured to invoke the device control application stored in the memory 1005, to implement the following operations:

receiving an authorization request transmitted by a target object through an application client, invoking the object login service based on the authorization request, and obtaining to-be-verified login information entered by the target object in the object login service;

performing matching of the to-be-verified login information with object credential information through the object login service, and if the to-be-verified login information matches the object credential information, obtaining an object authorization code for the target object, and returning the object authorization code to the application client, the object credential information being obtained by the service node from a consensus node of the blockchain network; and receiving a token obtaining request transmitted by the application client based on the object authorization code, invoking the token issuance service based on the token obtaining request, obtaining an object token for the target object through the token issuance service, and returning the object token to the application client, the object token providing an operation permission to the application client for resource data within a scope of authority, the operation permission meaning that the application client has a permission to operate the resource data through the service node.

The computer device 1000 described in embodiments of this application can implement the descriptions of the data processing method in the foregoing embodiments corresponding to FIG. 3 and FIG. 6, and can also implement the descriptions of the data processing apparatus 1 in the foregoing embodiment corresponding to FIG. 8. Details are not described herein again. In addition, the description of beneficial effects of the same method is not described herein again.

In addition, the embodiments of this application further provide a computer-readable storage medium. The computer-readable storage medium stores a computer program executed by the data processing apparatus 1 mentioned above, and the computer program includes program instructions. When executing the program instructions, the processor can perform the descriptions of the data processing method in the embodiments corresponding to FIG. 3 and FIG. 6. Therefore, details are not described herein again. In addition, the description of beneficial effects of the same method is not described herein again. For technical details that are not disclosed in the embodiments of the computer-readable storage medium of this application, refer to the method embodiments of this application.

In addition, the embodiments of this application further provide a computer program product or a computer program. The computer program product or the computer program may include computer instructions, and the computer instructions may be stored in a computer-readable storage medium. A processor of a computer device reads the computer instructions from the computer-readable storage medium. The processor may execute the computer instructions, to cause the computer device to perform the descriptions of the data processing method in the embodiments corresponding to FIG. 3 and FIG. 6. Therefore, details are not described herein again. In addition, the description of beneficial effects of the same method is not described herein again. For technical details that are not disclosed in the embodiment of the computer program product or computer program of this application, refer to the method embodiments of this application.

A person of ordinary skill in the art may understand that all or some of the procedures of the methods of the foregoing embodiments may be implemented by a computer program instructing relevant hardware. The computer program may be stored in a computer readable storage medium. When the program is executed, the program may include the procedures of the embodiments of the foregoing methods. The foregoing storage medium may include: a magnetic disk, an optical disc, a read-only memory (ROM), or a random access memory (RAM).

Disclosed above are merely exemplary embodiments of this application, and are certainly not intended to limit the patent scope of this application. Therefore, an equivalent change made according to the claims of this application still falls within the scope of this application.

What is claimed is:

1. A data processing method, performed by a service node in a blockchain network, comprising:
receiving an authorization request transmitted through an application client;
invoking an object login service based on the authorization request;
obtaining target login information entered in the object login service, the target login information including a target object identifier and a target object password;
invoking a login determining contract obtained from a consensus node of the blockchain network;
obtaining object credential information from an object information database through the login determining contract, the object credential information being obtained by the service node from on-chain data of the consensus node through synchronization, and the object credential information including object identifier credential information;
searching the object identifier credential information for the target object identifier;
in response to the object identifier credential information not including the target object identifier, determining that the target login information does not match the object credential information; and
in response to the object identifier credential information including the target object identifier:
determining a matching result between the target login information and the object credential information based on the target object password;
in response to the matching result indicating the target login information matching the object credential information, obtaining an object authorization code, and returning the object authorization code to the application client;
receiving a token obtaining request transmitted by the application client based on the object authorization code;
invoking a token issuance service based on the token obtaining request;
obtaining an object token through the token issuance service, the object token being configured to provide the application client with an operation permission to operate resource data within a scope of authority through the service node; and
returning the object token to the application client.

2. The method according to claim 1, wherein:
the object login service includes an object login front-end and an object login back-end;
invoking the object login service includes invoking the object login front-end based on the authorization request;
obtaining the target login information includes obtaining the target login information entered in the object login front-end; and
the login determining contract is invoked through the object login back-end.

3. The method according to claim 1, wherein:
the object credential information further includes object password credential information and character string credential information, one piece of object identifier credential information corresponding to one piece of object password credential information and one piece of character string credential information; and
determining the matching result includes:
splicing the target object password with character string credential information that corresponds to the target object identifier and that is in the object credential information, to obtain target spliced login information;
performing hash calculation on the target spliced login information, to obtain target hash login information;
comparing the target hash login information with object password credential information that corresponds to the target object identifier and that is in the object credential information;
generating, in response to the target hash login information being same as the object password credential information that corresponds to the target object identifier and that is in the object credential information, a first matching result representing that the target login information matches the object credential information; and generating, in response to the target hash login information being different from the object password credential information that corresponds to the target object identifier and that is in the object credential information, a second matching result representing that the target login information does not match the object credential information.

4. The method according to claim 1, wherein obtaining the object token includes:

invoking an authorization code verification contract through the token issuance service, the authorization code verification contract being obtained by the service node from the consensus node;

performing verification on the object authorization code through the authorization code verification contract; and in response to the verification on the object authorization code being successful, obtaining associated authorization information, and generating the object token based on the associated authorization information.

5. The method according to claim 4, wherein:

obtaining the object authorization code includes:

obtaining selected authorization information selected in the object login service, the selected authorization information including at least one of aging information, the operation permission, or the scope of authority, and the aging information representing a life cycle of the object token; and generating the object authorization code based on the selected authorization information; and obtaining the associated authorization information includes:

parsing the object authorization code, to obtain the associated authorization information.

6. The method according to claim 4, further comprising:

obtaining selected authorization information selected in the object login service, the selected authorization information including at least one of aging information, the operation permission, or the scope of authority, and the aging information representing a life cycle of the object token; and wherein obtaining the associated authorization information includes:

obtaining the associated authorization information from the object login service through the token issuance service.

7. The method according to claim 1, wherein the service node is further configured to provide an object information operation service;

the method further comprising:

receiving a resource operation request transmitted by the application client based on the object token;

invoking the object information operation service based on the resource operation request;

invoking a token verification contract through the object information operation service;

performing verification on the resource operation request and the object token through the token verification contract;

responding to the resource operation request through the object information operation service in response to the verification on the resource operation request and the object token being successful; and rejecting the resource operation request through the object information operation service in response to the verification on the resource operation request and the object token having failed.

8. The method according to claim 7, wherein performing verification on the resource operation request and the object token through the token verification contract includes:

obtaining authorization information associated with the object token through the token verification contract;

determining whether the resource operation request meets the authorization information;

determining, in response to the resource operation request meeting the authorization information, that the verification on the resource operation request and the object token is successful; and determining, in response to the resource operation request not meeting the authorization information, that the verification on the resource operation request and the object token has failed.

9. The method according to claim 7, wherein responding to the resource operation request through the object information operation service includes:

obtaining, in response to the resource operation request being a resource reading operation request, from an object information database through the object information operation service, target read data requested by the resource reading operation request to be read, the target read data belonging to the resource data; and returning the target read data to the application client.

10. The method according to claim 9, wherein obtaining the target read data includes:

obtaining the target read data from the object information database through the object information operation service in response to the object information database including the target read data; and in response to the object information database not including the target read data:

transmitting, through the object information operation service, a data synchronization request for the target read data to the consensus node;

obtaining synchronization data from on-chain data of the consensus node based on the data synchronization request for the target read data, the synchronization data including the target read data;

storing the synchronization data into the object information database; and obtaining the target read data from the object information database through the object information operation service.

11. The method according to claim 7, wherein responding to the resource operation request through the object information operation service includes:

obtaining, in response to the resource operation request being a resource writing operation request, through the object information operation service, target write data requested by the resource writing operation request to be written, the target write data belonging to the resource data; and writing the target write data into the object information database in response to the object information database not including the target write data.

12. The method according to claim 11, wherein writing the target write data into the object information database includes:

forwarding, in response to the object information database not including the target write data, the target write data to the consensus node, to cause the consensus node to package the target write data, generate a target block, and add the target block to the blockchain network; and transmitting a data synchronization request for the target write data to the consensus node, receiving the target write data returned by the consensus node based on the data synchronization request for the target write data, and writing the target write data into the object information database.

13. A computer device serving as a service node of a blockchain network, comprising:

one or more processors; and one or more memories storing one or more computer programs that, when executed by the one or more processors, cause the computer device to:

receive an authorization request transmitted through an application client;

invoke an object login service based on the authorization request;

obtain target login information entered in the object login service, the target login information including a target object identifier and a target object password;

invoke a login determining contract obtained from a consensus node of the blockchain network;

obtain object credential information from an object information database through the login determining contract, the object credential information being obtained by the service node from on-chain data of the consensus node through synchronization, and the object credential information including object identifier credential information;

search the object identifier credential information for the target object identifier;

in response to the object identifier credential information not including the target object identifier, determine that the target login information does not match the object credential information; and in response to the object identifier credential information including the target object identifier:

determine a matching result between the target login information and the object credential information based on the target object password;

in response to the matching result indicating the target login information matching the object credential information, obtain an object authorization code, and return the object authorization code to the application client;

receive a token obtaining request transmitted by the application client based on the object authorization code;

invoke a token issuance service based on the token obtaining request;

obtain an object token through the token issuance service, the object token being configured to provide the application client with an operation permission to operate resource data within a scope of authority through the service node; and return the object token to the application client.

14. The computer device according to claim 13, wherein:

the object login service includes an object login front-end and an object login back-end;

the object login service is invoked the object login front-end based on the authorization request;

the target login information is entered in the object login front-end; and the login determining contract is invoked through the object login back-end.

15. The computer device according to claim 13, wherein:

the object credential information further includes object password credential information and character string credential information, one piece of object identifier credential information corresponding to one piece of object password credential information and one piece of character string credential information; and the one or more computer programs, when executed by the one or more processors, further cause the computer device to:

splice the target object password with character string credential information that corresponds to the target object identifier and that is in the object credential information, to obtain target spliced login information;

perform hash calculation on the target spliced login information, to obtain target hash login information;

compare the target hash login information with object password credential information that corresponds to the target object identifier and that is in the object credential information;

generate, in response to the target hash login information being same as the object password credential information that corresponds to the target object identifier and that is in the object credential information, a first matching result representing that the target login information matches the object credential information; and generate, in response to the target hash login information being different from the object password credential information that corresponds to the target object identifier and that is in the object credential information, a second matching result representing that the target login information does not match the object credential information.

16. The computer device according to claim 13, wherein the one or more computer programs, when executed by the one or more processors, further cause the computer device to:

invoke an authorization code verification contract through the token issuance service, the authorization code verification contract being obtained by the service node from the consensus node;

perform verification on the object authorization code through the authorization code verification contract; and in response to the verification on the object authorization code being successful, obtain associated authorization information, and generate the object token based on the associated authorization information.

17. The computer device according to claim 16, wherein the one or more computer programs, when executed by the one or more processors, further cause the computer device to:

obtain selected authorization information selected in the object login service, the selected authorization information including at least one of aging information, the operation permission, or the scope of authority, and the aging information representing a life cycle of the object token;

generate the object authorization code based on the selected authorization information; and parse the object authorization code, to obtain the associated authorization information.

18. A non-transitory computer-readable storage medium storing one or more computer programs that, when executed by one or more processors of a service node of a blockchain network, cause the one or more processors to:

receive an authorization request transmitted through an application client;

invoke an object login service based on the authorization request;

obtain target login information entered in the object login service, the target login information including a target object identifier and a target object password;

invoke a login determining contract obtained from a consensus node of a blockchain network;

obtain object credential information from an object information database through the login determining contract, the object credential information being obtained by the service node from on-chain data of the consensus node through synchronization, and the object credential information including object identifier credential information;

search the object identifier credential information for the target object identifier;

in response to the object identifier credential information not including the target object identifier, determine that the target login information does not match the object credential information; and in response to the object identifier credential information including the target object identifier:

determine a matching result between the target login information and the object credential information based on the target object password;

in response to the matching result indicating the target login information matching the object credential information, obtain an object authorization code, and return the object authorization code to the application client;

receive a token obtaining request transmitted by the application client based on the object authorization code;

invoke a token issuance service based on the token obtaining request;

obtain an object token through the token issuance service, the object token being configured to provide the application client with an operation permission to operate resource data within a scope of authority through the service node; and return the object token to the application client.

\*    \*    \*    \*    \*